US011668953B2

(12) United States Patent
Rothman

(10) Patent No.: US 11,668,953 B2
(45) Date of Patent: Jun. 6, 2023

(54) GLASSES MANUFACTURE

(71) Applicant: Optimax Investments Ltd., Tel-Aviv (IL)

(72) Inventor: Eldad Rothman, Ramat HaSharon (IL)

(73) Assignee: Optimax Investments Ltd., Tel Aviv (IL)

( * ) Notice: Subject to any disclaimer, the term of this patent is extended or adjusted under 35 U.S.C. 154(b) by 0 days.

(21) Appl. No.: 17/878,164

(22) Filed: Aug. 1, 2022

(65) Prior Publication Data

US 2023/0013466 A1 Jan. 19, 2023

Related U.S. Application Data

(63) Continuation of application No. PCT/IL2022/050764, filed on Jul. 14, 2022.

(60) Provisional application No. 63/313,326, filed on Feb. 24, 2022, provisional application No. 63/221,571, filed on Jul. 14, 2021.

(51) Int. Cl.
*G02C 5/02* (2006.01)
(52) U.S. Cl.
CPC ....................................... *G02C 5/02* (2013.01)
(58) Field of Classification Search
CPC ....................................................... G02C 5/02

USPC .................................................... 351/41, 124
See application file for complete search history.

(56) References Cited

U.S. PATENT DOCUMENTS

| 9,995,948 | B2 | 6/2018 | Arieli et al. |
| 2012/0307194 | A1* | 12/2012 | Croft .................... G02C 11/12 351/44 |
| 2017/0299886 | A1 | 10/2017 | Carmon et al. |
| 2019/0155048 | A1 | 5/2019 | Bergner |
| 2021/0096399 | A1 | 4/2021 | Katzman et al. |

FOREIGN PATENT DOCUMENTS

| EP | 3771939 | 2/2021 |
| WO | WO 2021/161125 | 8/2021 |
| WO | WO 2021/198822 | 10/2021 |

OTHER PUBLICATIONS

International Search Report and the Written Opinion dated Dec. 21, 2022 From the International Searching Authority Re. Application No. PCT/IL2022/050764. (12 Pages).

* cited by examiner

*Primary Examiner* — Tuyen Tra

(57) ABSTRACT

A method of eyewear manufacture including: adhering frame material onto a surface of a corrective lens, the frame material extending along at least 10% of an edge circumference of the lens; and attaching the lens to a second lens.

29 Claims, 18 Drawing Sheets

GLASSES MANUFACTURE

RELATED APPLICATIONS

This application is a Continuation of PCT Patent Application No. PCT/IL2022/050764, having international filing date of Jul. 14, 2022 which claims the benefit of priority under 35 USC § 119(e) of U.S. Provisional Patent Application Nos. 63/221,571 filed on Jul. 14, 2021 and 63/313,326 filed on Feb. 24, 2022. The contents of the above applications are all incorporated by reference as if fully set forth herein in their entirety.

FIELD AND BACKGROUND OF THE INVENTION

The present invention, in some embodiments thereof, relates to glasses and glasses manufacture and, more particularly, but not exclusively, to customized glasses.

Background art includes:

U.S. Pat. No. 9,995,948 discloses "Apparatus and methods are described, including a corrective optical film for converting a corrective single-focal lens to a multi-focal lens and/or a progressive lens. A thickness and/or a curvature of the corrective optical film is different in different regions of the corrective optical film, such that the corrective optical film is configured, upon being adhered to the single-focal lens, to change a focal length of the single-focal lens differently in different regions of the single-focal lens. Other applications are also described."

International Patent Application No. WO2021161125A1 discloses "Apparatus and methods are described, including providing a temporary progressive lens (20) that is configured for a subject's temporary use, based upon an initial progressive-lens optical design. The lens is composed of a base lens (22) and an attached additional and removable progressive lens part (24) for test purposes. Data that are indicative of suitability of the optical design for activities that are performed by the subject are received, the data being generated during use of the temporary progressive lens by the subject. Based upon the received data, the optical design for a progressive lens for the subject is optimised, and the optimised optical design in output."

US Patent Publication No. US20210096399 discloses "Apparatus and methods are described including a progressive lens that is configured to provide a far-vision correction and a near-vision correction. The progressive lens includes a single-focus, far-vision corrective lens that is configured to provide only a portion of the far-vision correction, and a film coupled to the single-focus, far-vision corrective lens. The film defines a far-vision corrective portion that is configured to provide the remainder of the far-vision correction, a near-vision corrective portion that is configured to provide additive near-vision correction, and an intermediate portion in which the film transitions between the far-vision corrective portion and the near-vision corrective portion. Other applications are also described."

International Patent Application No. WO2021198822A1 discloses "Apparatus and methods are described including an additional lens (24) made from an amorphous viscoelastic material and having an optical design. A curvature of the additional lens (24) is changed such as to conform with a curvature of a base eyeglasses lens (22), without causing a loss of the optical design of the additional lens (24), by heating the additional lens (24) to a temperature at which a Tan Delta of the amorphous viscoelastic material is between 0.2 and 0.8, and shaping the additional lens (24). Subsequently, the additional lens (24) is adhered to the base eyeglasses lens (22). The optical design of the additional lens (24) is such that, upon being adhered to the base eyeglasses lens (22), the adhered base eyeglasses lens (22) and the additional lens (24) provide a combined lens (20) having a desired optical prescription. Other applications are also described."

SUMMARY OF THE INVENTION

Following is a non-exclusive list including some examples of embodiments of the invention. The invention also includes embodiments which include fewer than all the features in an example and embodiments using features from multiple examples, also if not expressly listed below.

Example 1. A method of eyewear manufacture comprising:
adhering frame material onto a lens surface of a corrective lens, said frame material extending along at least 10% of an edge circumference of the lens; and
attaching said lens to a second lens.

Example 2. The method according to example 1, comprising applying said frame material to said surface by printing said frame material onto said surface.

Example 3. The method according to example 1, wherein said adhering comprises printing said frame material onto said lens surface.

Example 4. The method according to example 1, comprising providing frame material on a substrate.

Example 5. The method according to example 4, comprising printing said frame material onto said substrate.

Example 6. The method according to any one of examples 4-5, comprising transferring said frame material from said substrate to said lens surface.

Example 7. The method according to any one of examples example 4-6, wherein said adhering comprises adhering said substrate to said lens surface.

Example 8. The method according to any one of examples 4-7, wherein said substrate includes an adhesive layer, where adhering said frame material comprises contacting said adhesive layer to said lens surface.

Example 9. The method according to any one of examples 2-3 or 5, wherein said printing comprises inkjet printing.

Example 10. The method according to any one of examples 1-9, wherein said surface of said corrective lens has a curvature.

Example 11. The method according to example 10 wherein said curvature is 0.25-15 diopters.

Example 12. The method according to any one of examples 1-9, comprising removing a portion of said surface to form at least one recession on said surface.

Example 13. The method according to example 12, wherein said removing comprises laser removing.

Example 14. The method according to any one of examples 12-13, wherein said removing is of at least a portion of a lens coating.

Example 15. The method according to any one of examples 12-14, wherein said adhering is to said at least one recession.

In another example, the method according to any one of examples 1-15 is used in which there is provided surface treating at least a portion of said surface in a manner which improves surface adhesion properties. Optionally, said surface treating comprises surface treating using plasma.

Example 16. The method according to any one of the previous examples, comprising cutting said lens to a desired shape.

Example 17. The method according to example 16, comprising repeating said adhering and said cutting for said second lens.

Example 18. A pair of glasses comprising:
a first corrective lens;
a second corrective lens, where at least one of said first corrective lens and said second corrective lens has a frame described on a surface of said lens said frame having different optical properties than said surface, said frame extending along at least 10% of an edge circumference of the lens; and
a connector connecting said first corrective lens and said second corrective lens.

Example 19. The pair of glasses according to example 18, wherein said frame is adhered to said surface.

Example 20. The pair of glasses according to any one of examples 18-19, wherein said frame is cut into said surface.

Example 21. The pair of glasses according to any one of examples 18-20, wherein said frame comprises a different surface coating than said surface.

Example 22. The pair of glasses according to any one of examples 18-21, wherein said frame has one or more of a different transmittance, a different translucency, a different color, and a different surface texture than said surface.

Example 23. The pair of glasses according to any one of examples 18-22, wherein a transmittance of said frame is a least 10% less than a transmittance of said lens on which said frame is disposed.

Example 24. The pair of glasses according to any one of examples 18-23, wherein said frame is opaque.

Example 25. The pair of glasses according to example 18, wherein said frame is a frame printed onto said surface.

Example 26. The pair of glasses according to example 18, wherein said frame is printed onto a layer which is adhered to the surface.

Example 27. The pair of glasses according to example 25, wherein said frame is printed and transferred onto said surface.

Example 28. The pair of glasses according to any one of examples 18-27, wherein material of said frame protrudes above a surface of said lens to which it is adhered by at most 100 μm.

Example 29. The pair of glasses according to any one of examples 18-28, wherein material of said frame protrudes above a surface of said lens to which it is adhered by at most 50 μm.

Example 30. The pair of glasses according to any one of examples 18-29, wherein said first lens has said frame adhered to a surface of said first lens and said second lens has said frame adhered to a surface of said second lens.

Example 31. The pair of glasses according to any one of examples 18-30, comprising a first arm connected to said first corrective lens and a second arm connected to said second corrective lens.

Example 32. The pair of glasses according to any one of examples 18-31, wherein said frame has a visible pattern of varying color and/or shade.

Example 33. The pair of glasses according to any one of examples 18-32, wherein said frame does not extend to cover edges of said lens to which it is adhered.

Example 34. A method of customizing a glasses manufacturing process comprising: receiving one or more feature measurement of a customer; and designing a glasses frame of a glasses design, said glasses frame to be adhered to a lens, said designing, based on said one or more customer feature.

Example 35. The method according to example 34, said lens is a corrective lens, correction according to a corrective prescription of said customer.

Example 36. The method according to any one of examples 34-35, wherein said designing comprises designing a size and shape of said glasses frame.

Example 37. The method according to any one of examples 34-36, wherein said designing comprises designing a glasses lens shape, based on said customer feature measurement.

Example 38. The method according to any one of examples 34-37, wherein said one or more customer feature comprises a customer pupil distance (PD).

Example 39. The method according to example 38, wherein a shape of a lens of said glasses is scaled using said customer PD.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

As will be appreciated by one skilled in the art, some embodiments of the present invention may be embodied as a system, method or computer program product. Accordingly, some embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, some embodiments of the present invention may take the form of a computer program product embodied in one or more computer readable medium(s) having computer readable program code embodied thereon. Implementation of the method and/or system of some embodiments of the invention can involve performing and/or completing selected tasks manually, automatically, or a combination thereof. Moreover, according to actual instrumentation and equipment of some embodiments of the method and/or system of the invention, several selected tasks could be implemented by hardware, by software or by firmware and/or by a combination thereof, e.g., using an operating system.

For example, hardware for performing selected tasks according to some embodiments of the invention could be implemented as a chip or a circuit. As software, selected tasks according to some embodiments of the invention could be implemented as a plurality of software instructions being executed by a computer using any suitable operating system. In an exemplary embodiment of the invention, one or more tasks according to some exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

Any combination of one or more computer readable medium(s) may be utilized for some embodiments of the invention. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium and/or data used thereby may be transmitted using any appropriate medium, including but not limited to wireless, wireline, optical fiber cable, RF, etc., or any suitable combination of the foregoing.

Computer program code for carrying out operations for some embodiments of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Some embodiments of the present invention may be described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Some of the methods described herein are generally designed only for use by a computer, and may not be feasible or practical for performing purely manually, by a human expert. A human expert who wanted to manually perform similar tasks, such inspecting objects, might be expected to use completely different methods, e.g., making use of expert knowledge and/or the pattern recognition capabilities of the human brain, which would be vastly more efficient than manually going through the steps of the methods described herein.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In some embodiments, although non-limiting, like numerals are used to refer to like elements in different figures, for example, element 105 in FIG. 1 corresponding to element 1405 in FIG. 14.

In the drawings:

FIG. 1 is a simplified schematic of a system for glasses manufacture, according to some embodiments of the invention;

FIG. 2 is a method of glasses design, according to some embodiments of the invention;

FIG. 3 is a method of glasses manufacture, according to some embodiments of the invention;

FIG. 4 is a detailed method of glasses manufacture, according to some embodiments of the invention;

Figure 5A:
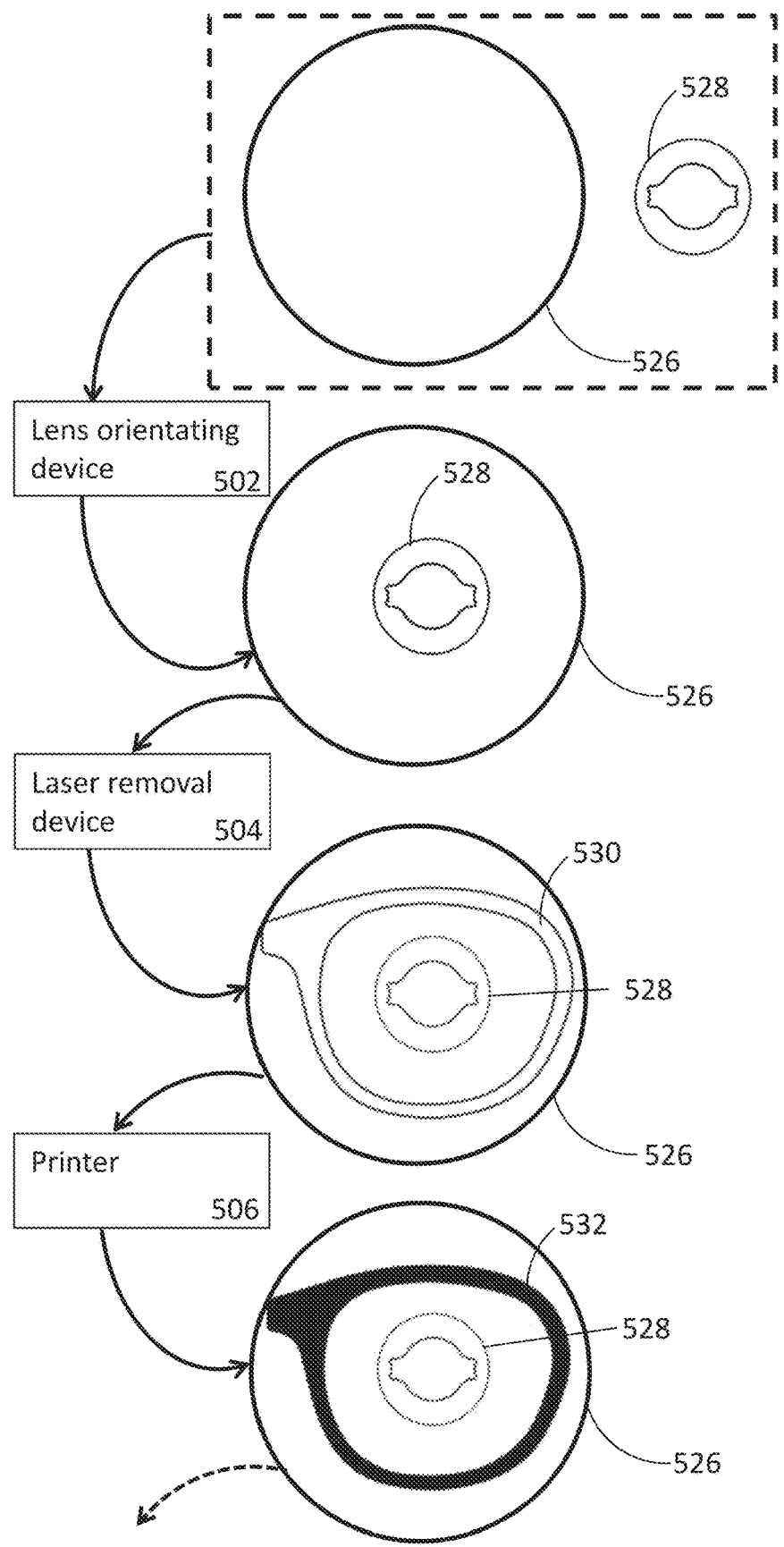
Figure 5B:
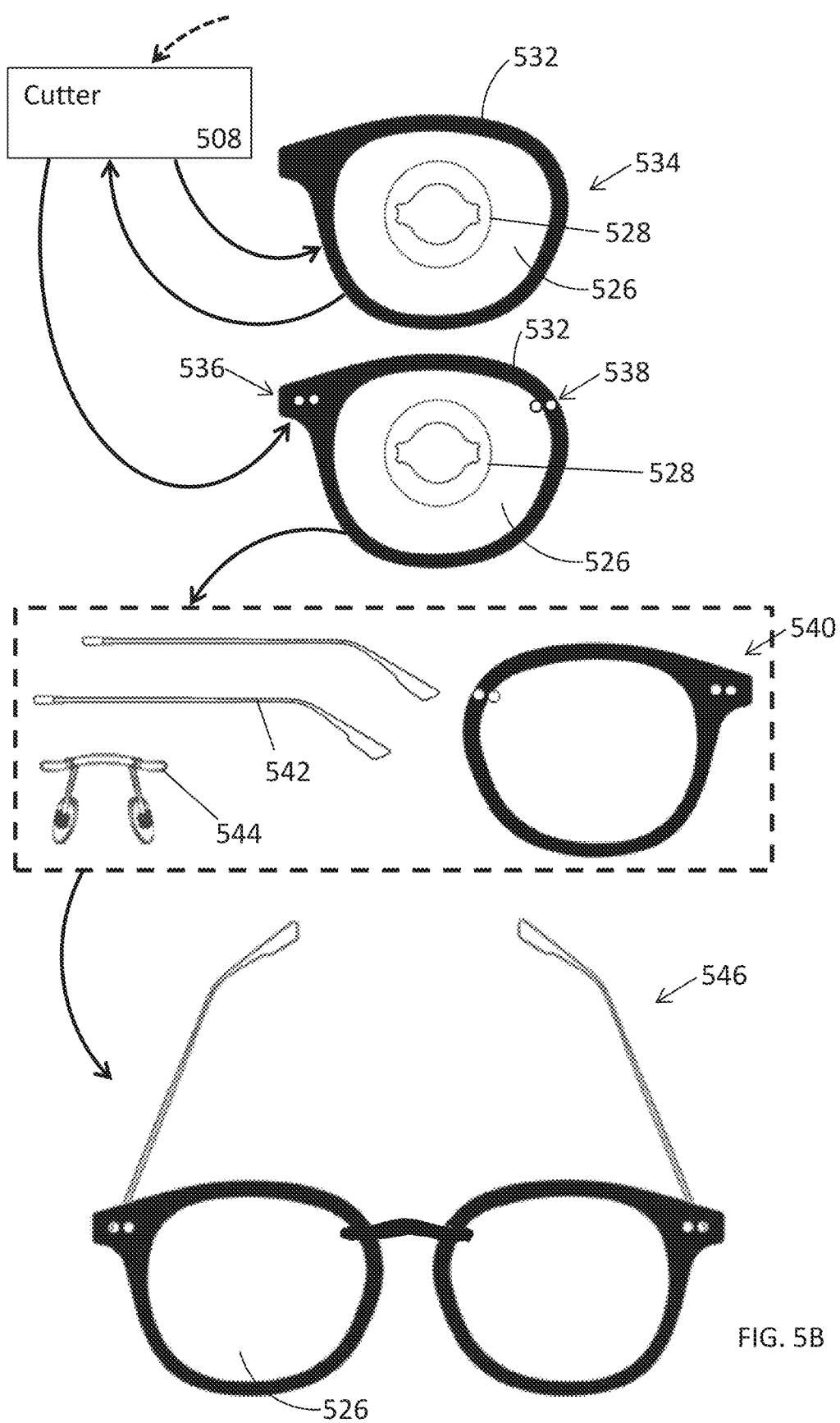
Figure 7A:
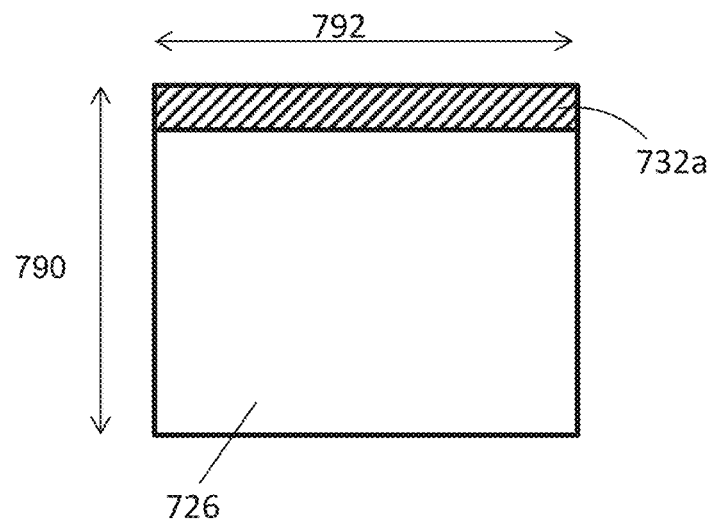
Figure 7C:
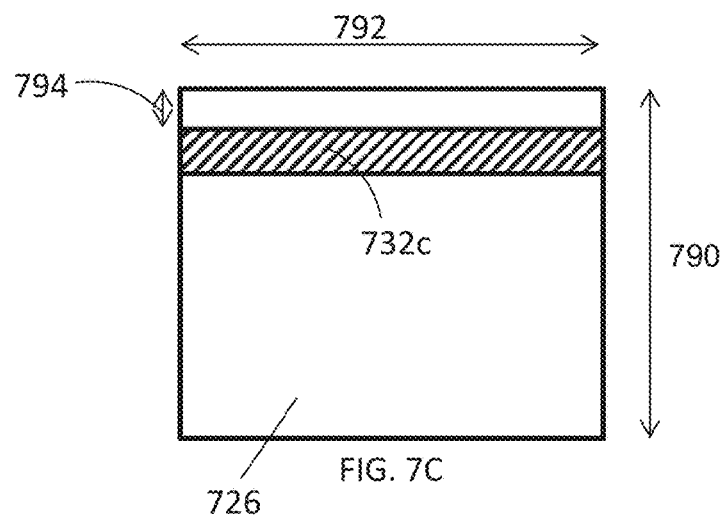
Figure 7B:
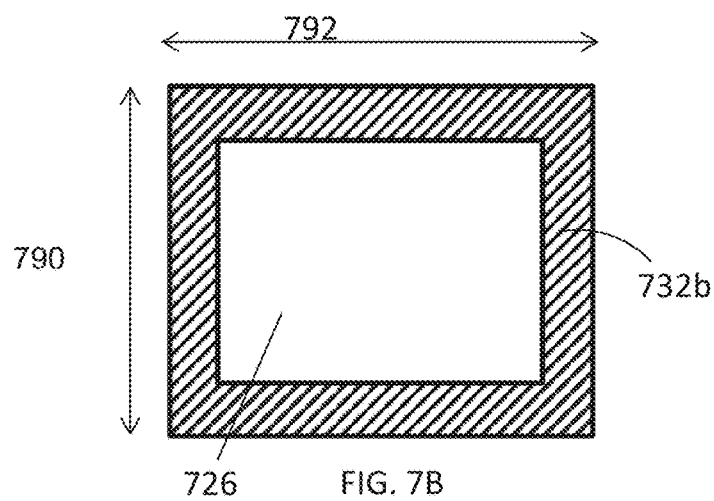
Figure 8:
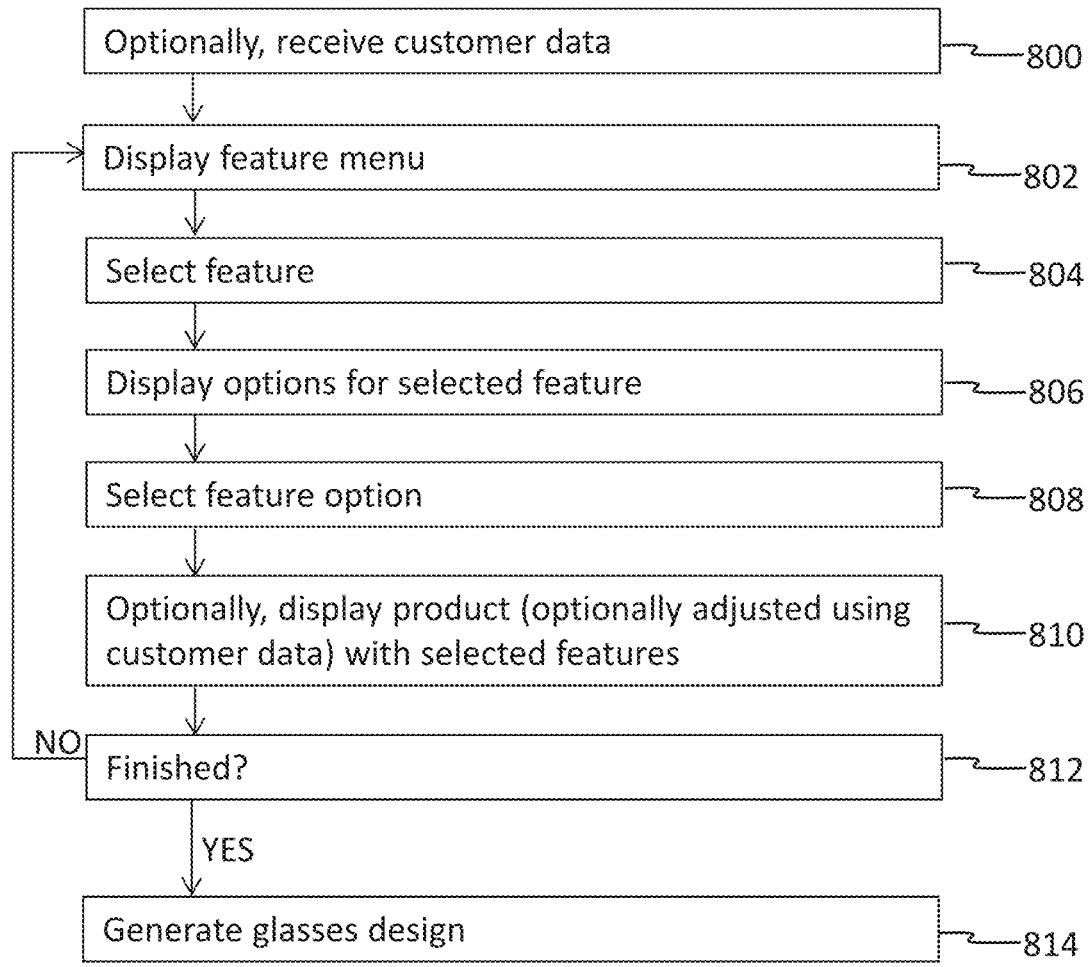
Figure 10:
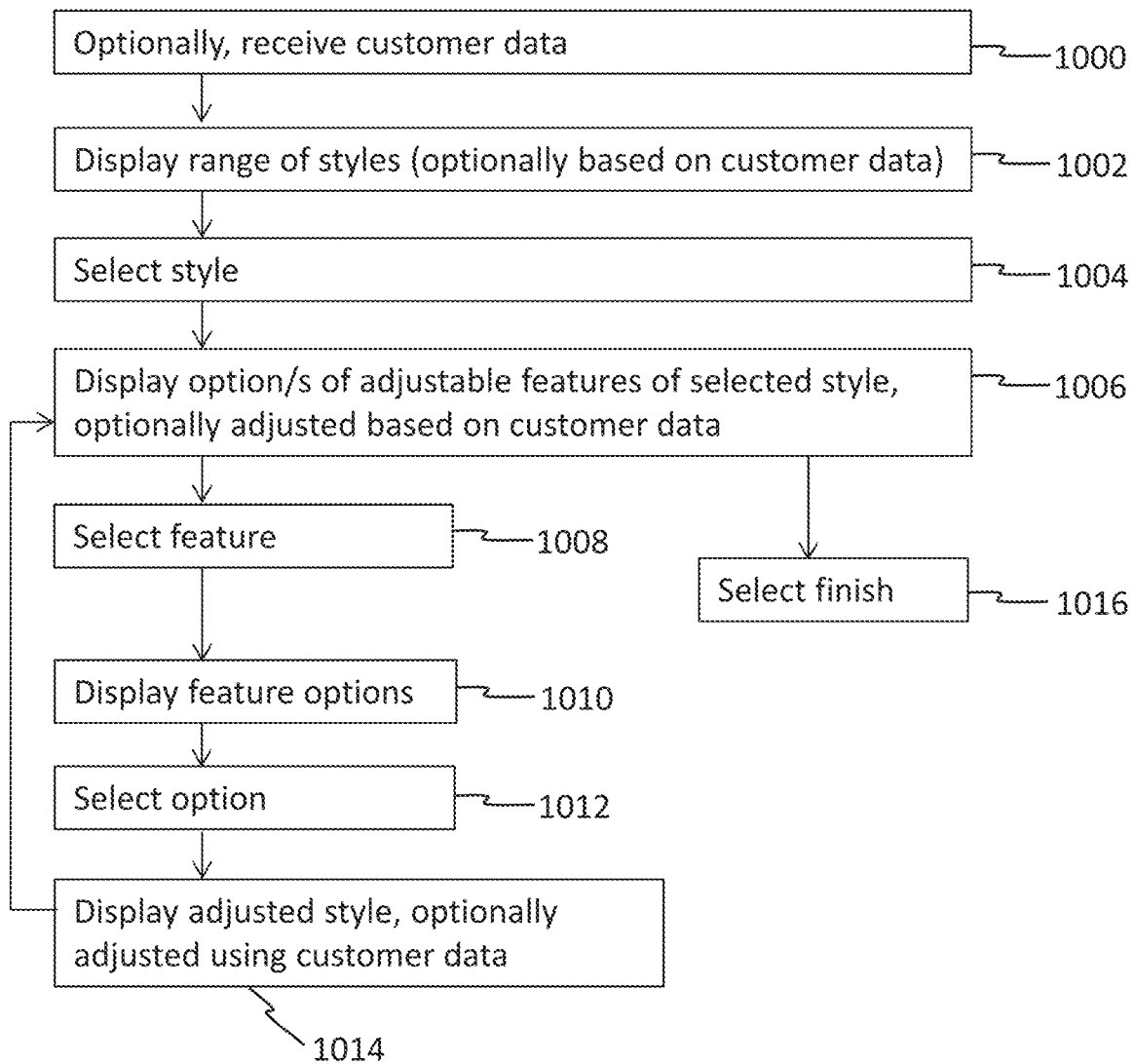
Figure 11:
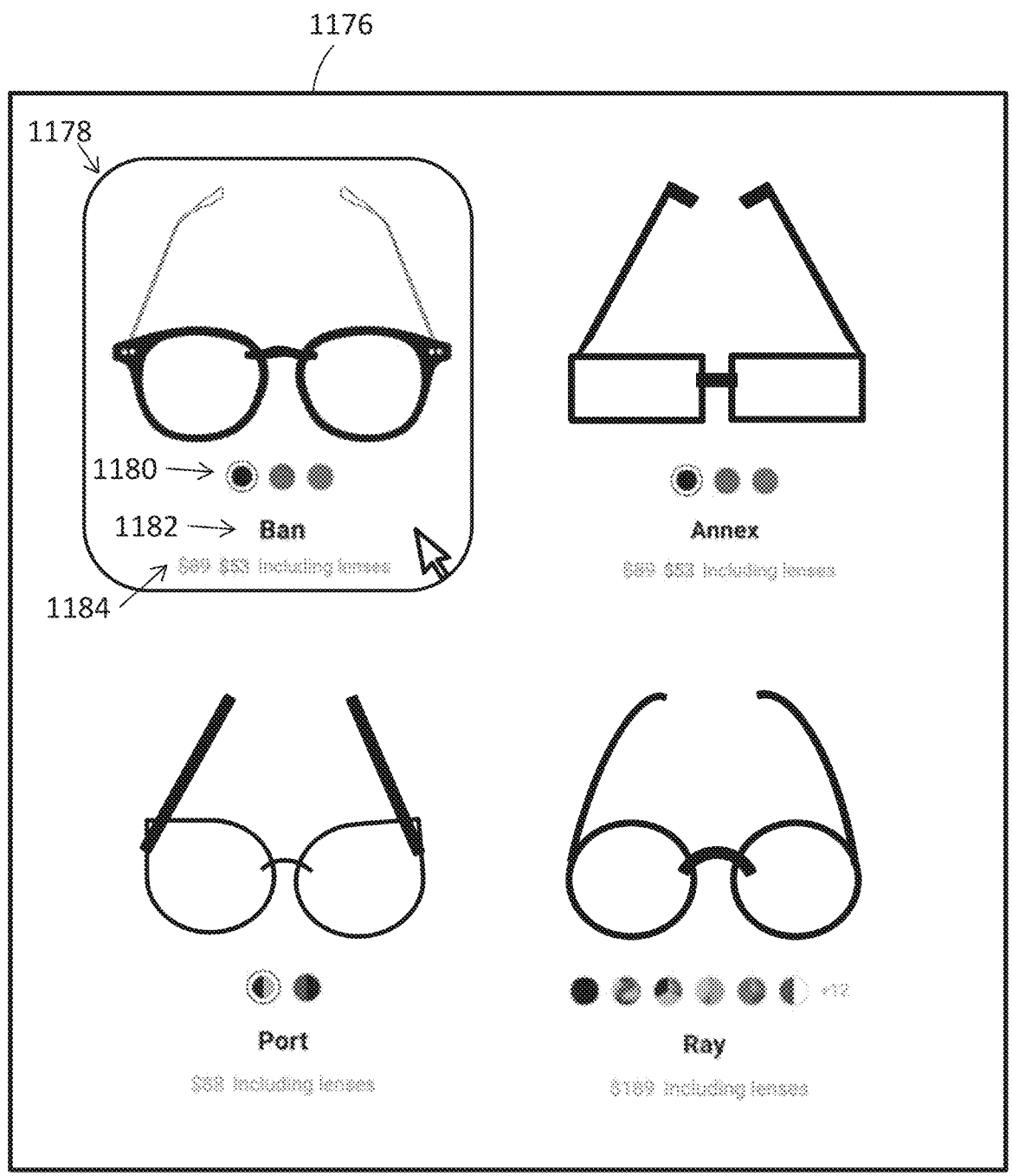
Figure 12:
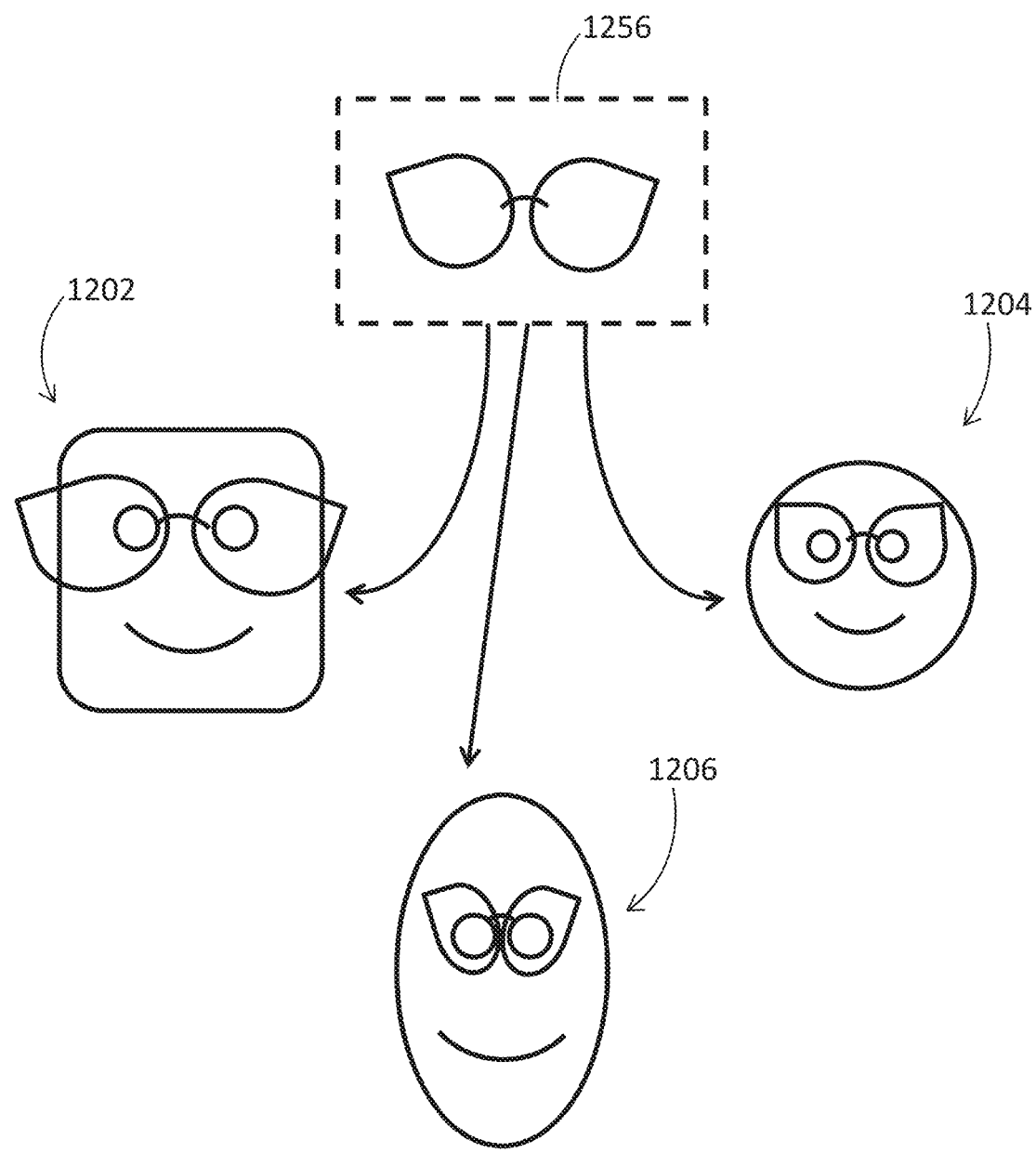
Figure 13:
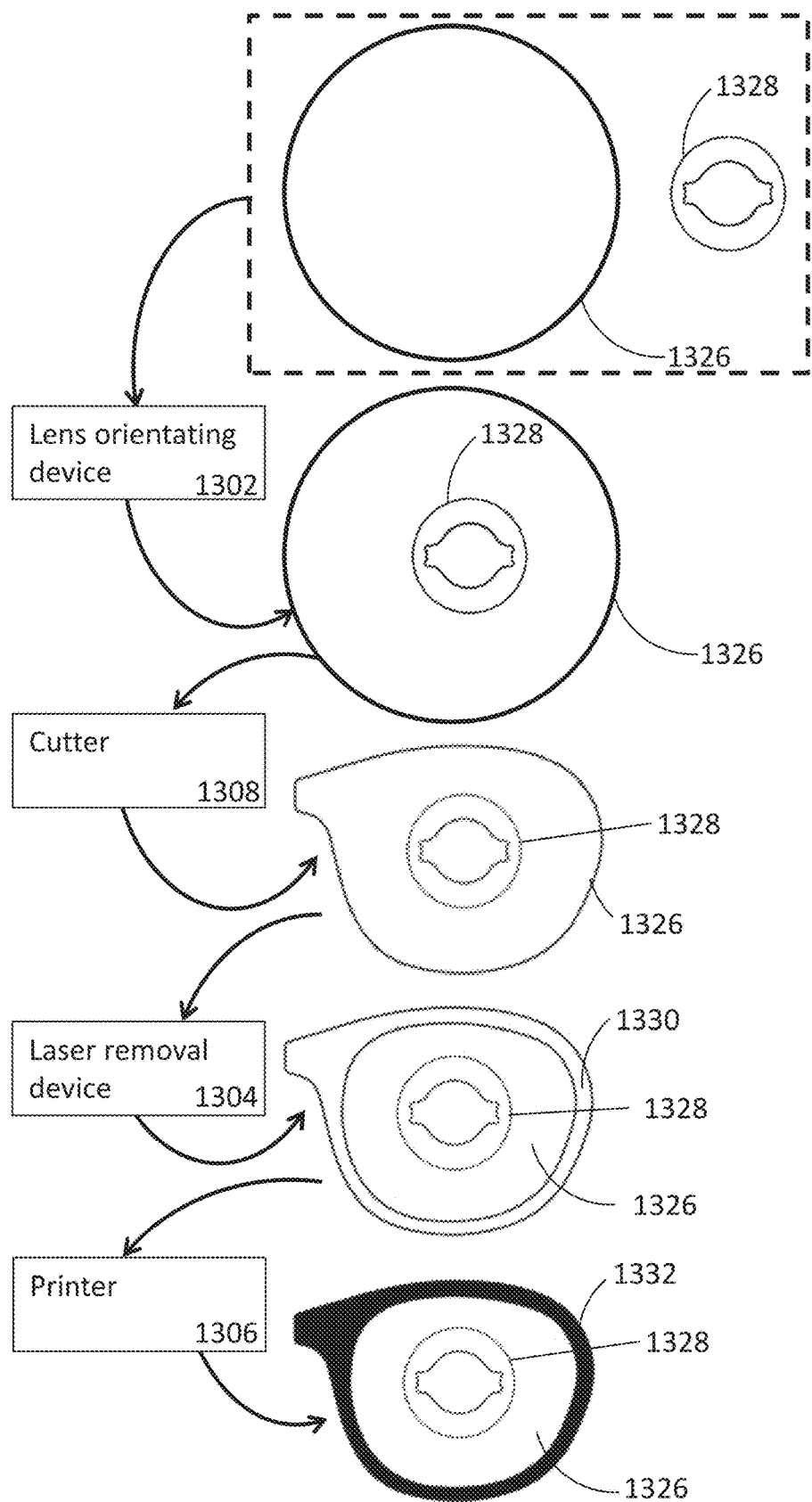
Figure 14:
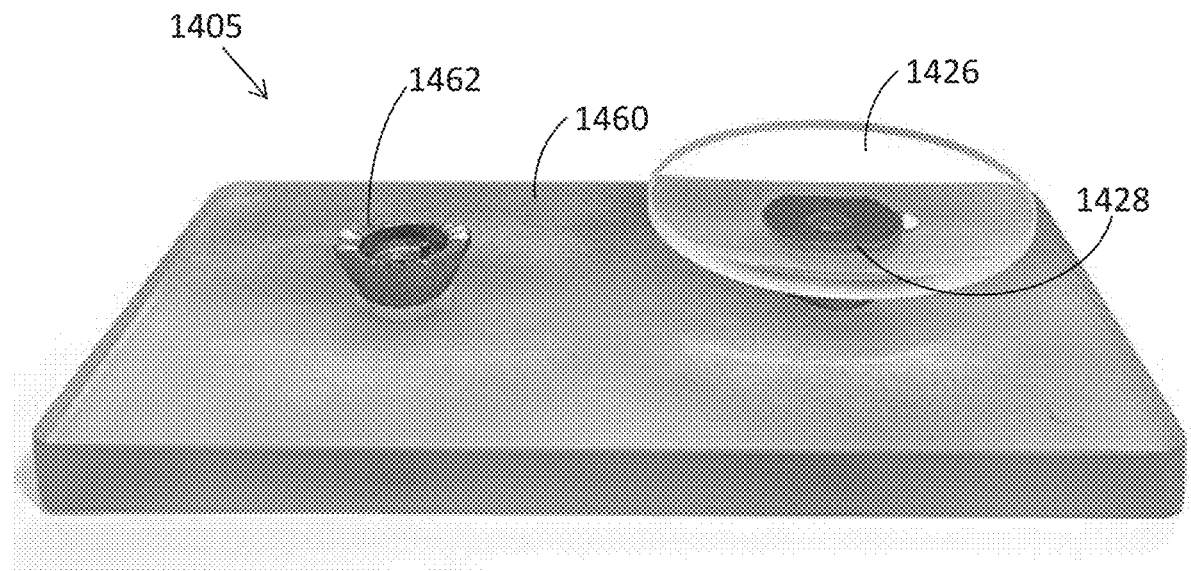
Figure 15:
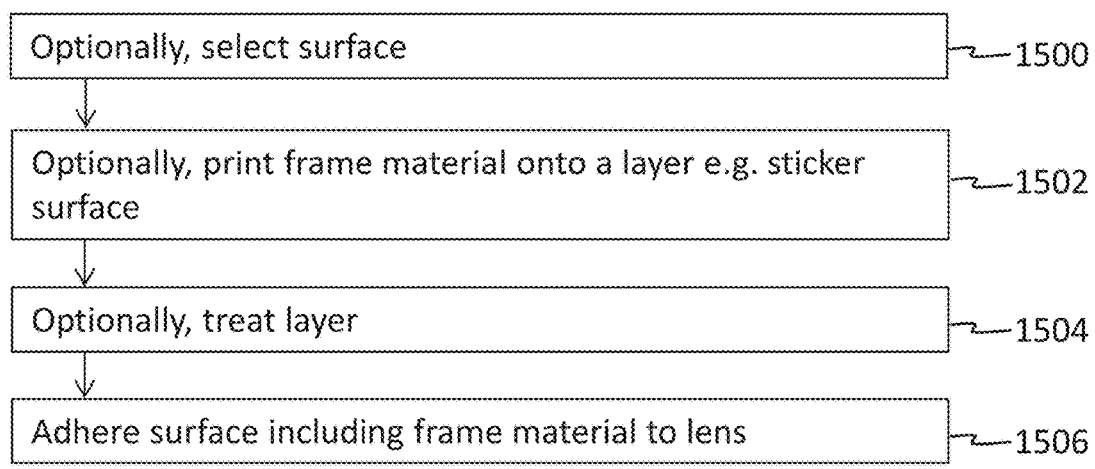
Figure 16:
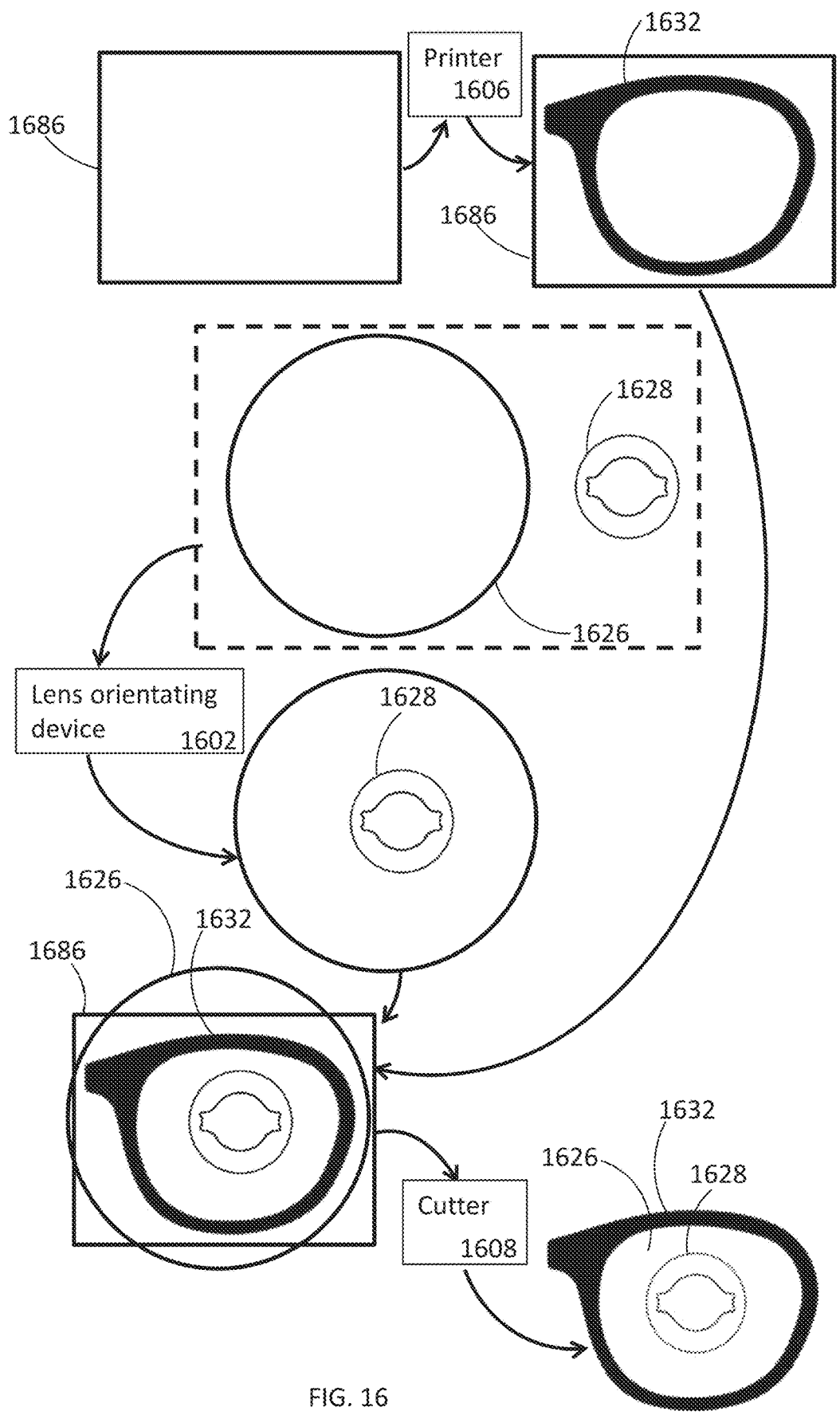
Figure 17A:
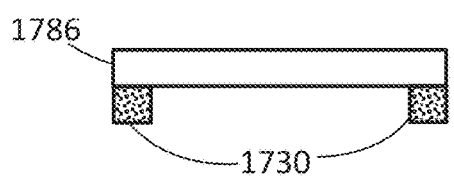
Figure 18A:
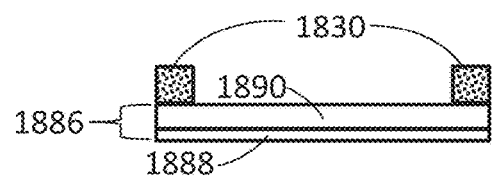
Figure 17B:
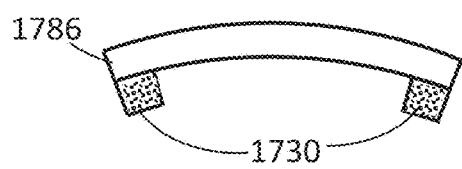
Figure 18B:
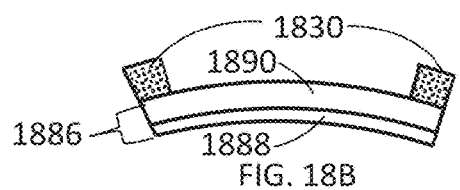
Figure 17C:
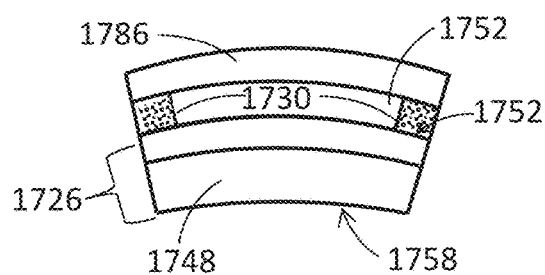
Figure 18C:
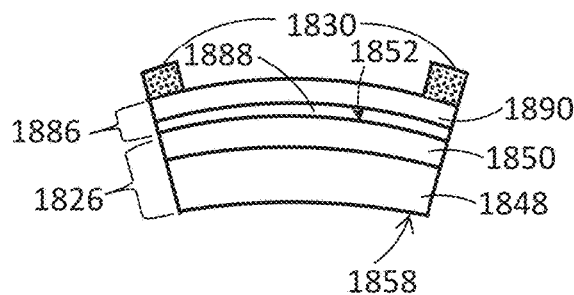
Figure 17D:
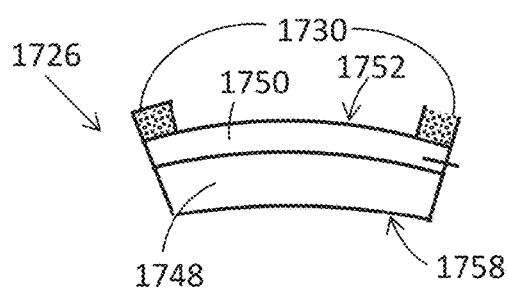
Figure 19:
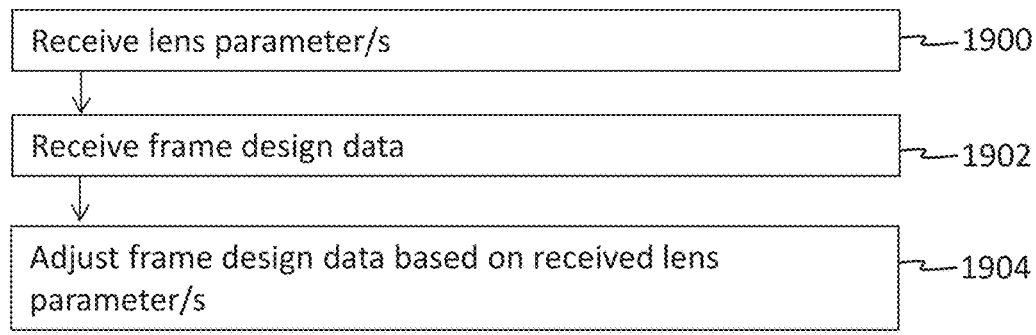

FIGS. 5A-B are simplified schematics illustrating manufacture of a pair of glasses, according to some embodiments of the invention;

FIGS. 6A-G are simplified schematic cross sections of a lens, illustrating manufacture steps, according to some embodiments of the invention;

FIG. 7A is a simplified schematic of a lens with a frame, according to some embodiments of the invention;

FIG. 7B is a simplified schematic of a lens with a frame, according to some embodiments of the invention;

FIG. 7C is a simplified schematic of a lens with a frame, according to some embodiments of the invention;

FIG. 8 is a method of generating a customer tailored glasses design, according to some embodiments of the invention;

FIGS. 9A-G are simplified schematics of a GUI, according to some embodiments of the invention;

FIG. 10 is a method of generating a customer tailored glasses design, according to some embodiments of the invention;

FIG. 11 is a simplified schematic of a GUI of different glasses styles according to some embodiments of the invention;

FIG. 12 is a simplified schematic illustrating tailoring of a glasses style for different customers, according to some embodiments of the invention;

FIG. 13 is a simplified schematic illustrating manufacture of a pair of glasses, according to some embodiments of the invention;

FIG. 14 is a simplified schematic of a lens jig, according to some embodiments of the invention;

FIG. 15 is a method of glasses manufacture, according to some embodiments of the invention;

FIG. 16 is a simplified schematic illustrating manufacture of a pair of glasses, according to some embodiments of the invention;

FIG. 17A is a simplified schematic cross section of a layer and frame material, according to some embodiments of the invention;

FIG. 17B is a simplified schematic cross section of a layer and frame material 1730, according to some embodiments of the invention;

FIG. 17C is a simplified schematic cross section of a lens to which a layer and frame material have been applied, according to some embodiments of the invention;

FIG. 17D is a simplified schematic cross section of a lens and frame material, according to some embodiments of the invention;

FIG. 18A is a simplified schematic cross section of a layer and frame material, according to some embodiments of the invention;

FIG. 18B is a simplified schematic cross section of a layer and frame material, according to some embodiments of the invention;

FIG. 18C is a simplified schematic cross section of a lens to which a layer and frame material have been applied, according to some embodiments of the invention;

FIG. 19 is a method of frame adjustment, according to some embodiments of the invention.

DESCRIPTION OF SPECIFIC EMBODIMENTS OF THE INVENTION

The present invention, in some embodiments thereof, relates to glasses and glasses manufacture and, more particularly, but not exclusively, to customized glasses.

Overview

A broad aspect of some embodiments of the invention relates to glasses where at least a portion of frames of the glasses are disposed on a surface of the glasses lens itself. In some embodiments, portion/s of the frame are adhered to the lens. In some embodiments, the frame is positioned on and/or adhered to the lens by being printed onto the lens, for example, inkjet printing e.g. directly onto the lens. In some embodiments, the frame is positioned on and/or adhered to the lens by being printed onto a substrate. Where the frame is transferred to the lens from the substrate and/or the substrate is applied (e.g. adhered) to the lens (e.g. including one or more feature as described and/or illustrated in U.S. Pat. No. 9,995,928 which is herein incorporated by reference in its entirety). For example, in some embodiments, a frame decoration is printed on a transparent sticker which is then applied (e.g. adhered) to the lens.

In some embodiments, a frame is defined as a portion of a lens, and/or material attached to a lens which has different optical properties than the rest of the lens (herein termed the body of the lens). In some embodiments, the frame is more light absorbing than the lens, for example, the frame is opaque. In some embodiments, the frame has a different color and/or texture than that of the lens. In some embodiments, the frame is transparent but colored differently to the lens. For example, in the case of sunglasses, in some embodiments, a frame lacks tinted coating of the sunglasses. For example, in some embodiments, a transmittance of the frame is different than that of the lens body. For example, having a transmittance which is at least 10% less, or 5-90% less, or 10-90% less, or 50-90% less than the transmittance of the lens body.

In some embodiments, frames are portion/s of the lens having been treated differently in comparison the other region/s of the lens. For example, in some embodiments, a frame region is surface treated at frame region/s e.g. to reduce reflectiveness e.g. to produce a frame having less glossy appearance than the lens. In some embodiments, a frame includes material deposited onto a surface of a lens e.g. by printing and/or by transferring the frame material from another surface to the lens and/or by adhering a substrate to which the frame is attached to the lens.

In some embodiments, frame material is deposited onto a substrate by printing. In some embodiments, the substrate has lower curvature than a surface of the lens to which frame material is to be located. A potential benefit of printing onto a low curvature (e.g. planar) substrate surface reduced complexity of printing. In some embodiments, the substrate is thin and/or flexible and/or deformable. Potentially enabling application (e.g. printing) of a frame onto a low curvature surface but yet transfer the frame to a curved optical corrective lens surface. A potential benefit being ease of printing onto a less curved surface e.g. in terms of accurate printing of a size and/or shape and/or pattern and/or texture. For example, where a printing head is not required to move in relation to the surface onto which it prints to accommodate curvature and/or compensate for curvature.

In some embodiments, the substrate includes material and/or region/s which change optical power, for at least a portion of the lens is used. For example, including one or more feature as described and/or illustrated in U.S. Pat. No. 9,995,928.

In some embodiments, the substrate is adhered to a large portion of the lens before and/or after cutting the lens to shape e.g. to 50-98%, or 80-98%, or 90-98%, of an area of the lens surface, or lower or higher or intermediate percentages or ranges. In some embodiments, the substrate includes different characteristics at different regions. For example, in some embodiments, the substrate includes a frame (e.g. including one or more feature as described previously in this "Overview" regarding a frame) and another portion e.g. through which the user's eye receives light. Where, in some embodiments, the other portion is centrally disposed on the lens. In some embodiments, the other portion is transparent and/or does not absorb light. In some embodiments, the other portions covers a large proportion of a surface of the lens (e.g. large proportion as defined above) and the frame covers a small proportion of the surface of the lens (e.g. 1-15%, or 1-5%, or lower or higher or intermediate ranges or percentages).

In some embodiments, the substrate includes an adhesive layer. Where, in some embodiments, the substrate is adhered to the lens by the adhesive layer. In some embodiments, the adhesive layer covers a large proportion of a side of the substrate e.g. to 50-98%, or 80-98%, or 90-98%, of an area of the substrate surface, or lower or higher or intermediate percentages or ranges.

In some embodiments, the frame material itself is adhesive (e.g. under certain conditions e.g. when treated thermally e.g. prior to curing). Where, in some embodiments, the frame material is applied to the lens using the substrate and, optionally, the substrate is then removed.

In some embodiments, the frame (e.g. is decorative) does not provide mechanical strength to the lens and/or glasses.

In some embodiments, a frame region is located at an edge region of a lens, for a proportion of a circumference of the edge of the lens. Where, in some embodiments, the circumference is determined as a total length of an outer edge of the lens. Where, in some embodiments, frame is disposed around at least 20% of the lens circumference or 5-100%, or 20-100%, or 50-100%, or at least 30%, or at least 40%, or lower or higher or intermediate percentages or ranges.

In some embodiments, the frame is disposed at the external edge of the lens and extends at least 0.1 mm, or at least, 0.5 mm, or 0.1-5 mm inwards from the external edge of the lens. In some embodiments, the frame is not disposed at the external edge, for at least a proportion of a length of the frame and/or edge circumference. Where, in some embodiments, the frame is disposed on the lens at a distance of at most 0.1-3 mm from the lens edge, for one or more portion of the frame.

In some embodiments, the frame includes portions disposed on an anterior and/or a posterior surface of the lens. In some embodiments, the frame, alternatively or additionally, includes a portion on an edge surface of the lens. In some embodiments, the frame includes portion/s within the lens. For example, in some embodiments, a hollow is made in a lens leaving lens material posterior and anterior to the hollow. The hollow forming at least a portion of the frame and/or material filling the hollow forming at least a portion of the frame.

In some embodiments, material is adhered to a large portion of the lens. For example, a coating e.g. anti-reflective, light absorptive (sunglasses) is adhered to at least a central portion of the lens e.g. at least to a central 50-98%, or 80-98%, or 90-98%, of an area of the lens surface before and/or after cutting the lens to shape, or lower or higher or intermediate percentages or ranges. In some embodiments, the coating is applied and/or adhered by printing.

In some embodiments, the lens is a prescriptive correction lens, a transmissive optical device that focuses or disperses a light beam by means of refraction. In some embodiments, the lens is not prescriptive, e.g. is cosmetic and for example, does not provide focus or dispersion of light and/or has inner and/or deviates from planar by at most 100 μm, or at most 50 μm, or at most, 10 μm, or at most 1 μm, or lower or higher or intermediate distances.

Optionally, in some embodiments, at least a portion of the lens is prepared prior to application of the frame. In some embodiments, preparation includes removing a portion of a surface of the lens and/or creating a hollow in the lens e.g. into which frame material is deposited. For example, in an exemplary embodiment, treatment includes removing a portion of a lens coating.

A potential advantage, in some embodiments, of the preparation is increased adherence of the frame to the lens. A potential advantage, in some embodiments, of the preparation, is recessing of the frame within the lens e.g. potentially protecting the lens material and/or improving aesthetics of the frame.

In some embodiments, a portion of a surface area of a lens surface (e.g. posterior and/or anterior surface) is treated. In some embodiments, a portion of a depth of a layer is treated. For example, where a depth of a coating layer is at least partially removed, e.g. for one or more surface area region. In some embodiments, such surface is treated, for example, using plasma, for example, cold plasma, in a manner which improves adhesion thereto.

In some embodiments of the invention, the plasma treatment increases surface energy which may reduce surface tension and thereby increase wettability. In some embodiments of the invention, the plasma is configured to cause the removal of hydrogen (or breaking of hydrogen bonds) and/or provision of oxygen or other species (this may depend on the gas used to create the plasma). This may replace existing hydrogen bonds. Increase in available bonds may increase surface energy. This effect may be short term (e.g., minutes to hours). However, while it lasts, broken bonds in the surface layer allow the surface to be more adherable-to. Such treatment may be especially beneficial in deposited polymer-type materials which may have mostly closed bonds, for example C—H and H—H bonds.

Optionally or additionally, the plasma treatment is configured to increase surface energy by removing contaminants which are taking up bonding energy.

In some embodiments, material is deposited on the lens to form at least a portion of the frame. In some embodiments, the material adheres to the lens.

In some embodiments, printing onto the lens is using ink/s configured to adhere to glass and/or ocular lens plastic/s (e.g. allyl diglycol carbonate (ADC) Polycarbonate, Trivex, High-index plastics (thiourethanes).

In some embodiments, printing of ink onto the lens (and/or onto a surface which is then adhered to a lens) includes printing multiple layers of ink e.g. onto one or more portion of the lens. In some embodiments, multiple layers are applied to some but not all portion/s of the frame e.g. potentially resulting in a non-uniform height of the frame material above the lens e.g. giving textured appearance.

In some embodiments, a single color and/or a single material is printed onto the lens. In some embodiments, multiple colors are printed onto the lens. In some embodiments, multiple different inks (e.g. different color and/or composition) are printed onto the lens.

In some embodiments, a pattern is printed onto the lens, where the pattern includes in some embodiments, a texture and/or a repeating pattern and/or has a non-uniform extent (e.g. width of the frame) on the lens. In some embodiments, the pattern does not include text, or has repeating text, for example, is not just a logo. In some embodiments, the pattern covers at least 1-15%, or 1-5%, of a surface area of the lens surface e.g. is not just a logo printed onto the lens.

In some embodiments, one or more treatment is performed to the frame material after and/or during printing. For example, heating (e.g. after and/or during printing) and/or curing (e.g. UV curing). For example, application of a top coat.

In some embodiments, a thickness of the frame material e.g. a thickness of one or more portion of a layer of frame material disposed on the lens is 1 μm-1 mm, or 1 μm-500μ, or 50-200 μm, or lower or higher or intermediate ranges or thicknesses.

A potential advantage of producing glasses frames by adhering frame material to the lens (e.g. by printing) is the ability to manufacture custom and/or adjusted frames e.g. rapidly. A broad aspect of some embodiments of the invention relates to manufacturing glasses which are tailored to a particular user where tailoring extends beyond providing an individual corrective prescription.

In some embodiments, a customer selects and/or adjusts one or more feature e.g. a group of features for glasses. For example, a customer "building" appearance of glasses by selecting and/or adjusting aesthetic feature/s of glasses. For example, size and/or shape and/or color of lenses and/or a frame. For example, style of glasses bridge and/or arms.

In some embodiments, one or more portion of tailoring includes tailoring one or more feature of glasses based on customer information e.g. automatically using received and/ or inputted data to adjust appearance of glasses for a particular customer. Where, in some embodiments, at least a portion tailoring remains under customer control, options being displayed and/or vetoed by the customer. Where, in some embodiments, at least a portion of tailoring is not presented to the customer. For example, where a selected style, in some embodiments, is automatically sized based on the customer anatomy.

In some embodiments, adjustment/s to glasses are based on data relating to the customer, for example, including one or more measured and/or inputted data. For example, customer physical features e.g. face shape, coloring, for example, customer age, sex, style preferences. In some embodiments, one or more adjustment is automatic. For example, in some embodiments, a customer is only presented with glasses options aligned and/or selected based on their data. For example, in some embodiments, a customer is only presented with glasses options suitable for their corrective prescription.

Alternatively or additionally, in some embodiments, a customer selects one or more feature of glasses. In some embodiments, customer manually selects each of a plurality of glasses features, for example, to custom build a glasses design.

In some embodiments, a customer is presented with glasses styles and, in some embodiments, after selection of a style, is able to adjust the style according to the preferences. The adjustment including selecting one or more feature to change from the provided styles. Where, in some embodiments, presented styles are tailored to the customer.

In some embodiments, glasses tailoring includes tailoring one or more portion of the glasses for compatibility with additional objects. For example, an anchor and/or other attachment for sunglasses (e.g. clip on sun-glasses) on the sunglasses themselves and/or the glasses. For example, sized and/or shaped for compatibility with other eyewear e.g. goggles, safety spectacles, virtual reality headset, Microsoft Hololens, Google glasses.

Throughout this document the term "glasses" has been used, however, this term should be understood to cover and refer to both prescriptive eyewear and non-prescriptive eyewear including, for example, but not restricted to; glasses, sunglasses, half lens glasses, pince-nez, monocle, and goggles.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Exemplary Glasses Manufacture System

Figure 1:
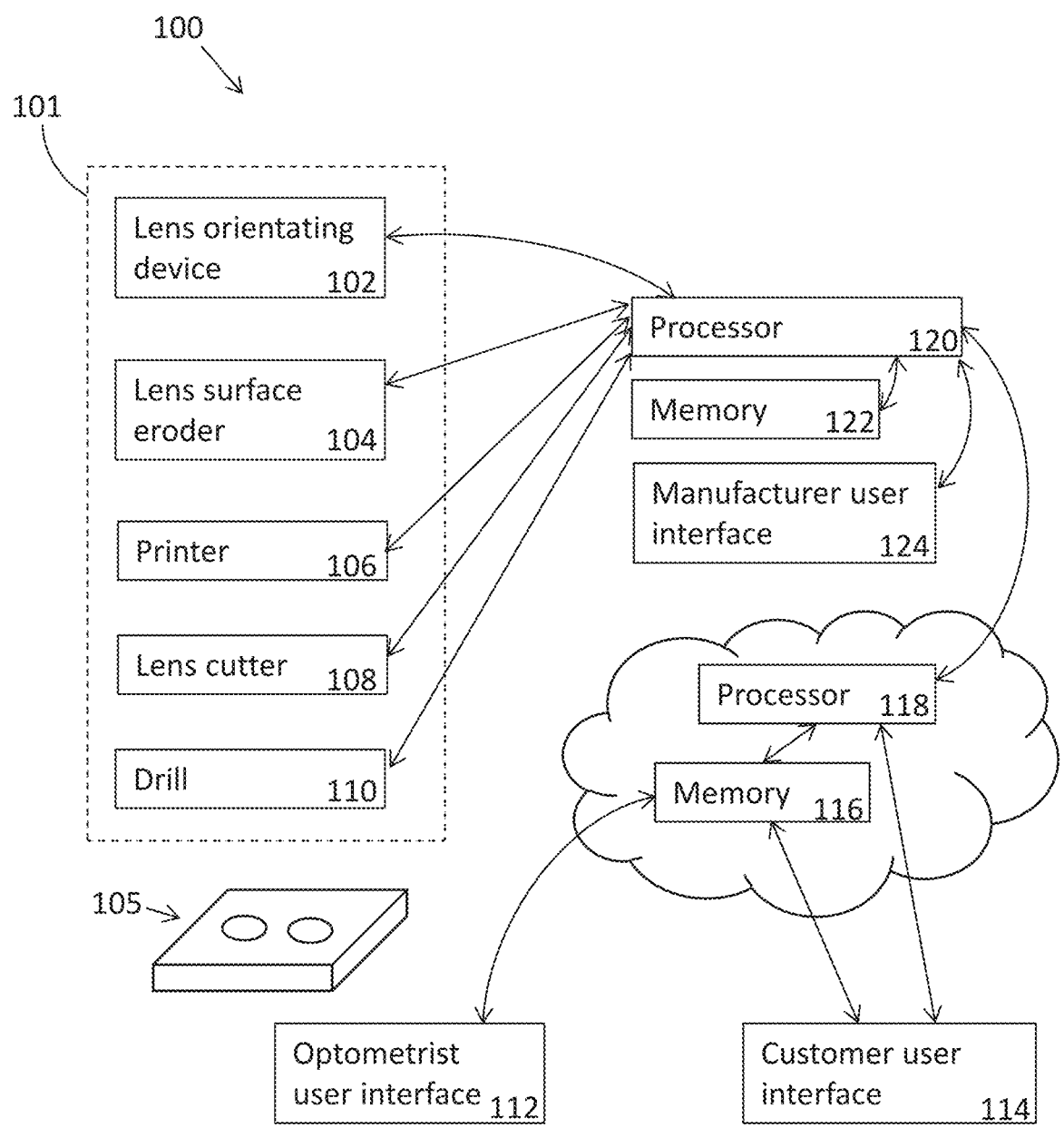

FIG. 1 is a simplified schematic of a system 100 for glasses manufacture, according to some embodiments of the invention.

In some embodiments, system 100 includes one or more glasses manufacturing device 101, which performs one or more portion of treatment to a lens in manufacture of glasses including the lens.

In some embodiments, manufacturing device/s 101 include one or more of; a lens orientating device 102, lens surface eroder 104 (or other surface treatment device), a printer 106, a lens cutter 108, and a drill 110. In some embodiments, printer 106 is any device capable of depositing and/or adhering material to the lens (and/or other portion of the glasses). For example, a directable deposition device and/or where deposition is controlled using a mask and/or by applying a material which is a desired size and/or shape (e.g. adhering a transfer).

In some embodiments, lens orientating device 102 is a commercially available device able to orientate a lens (e.g. a "tracer"), based on a received customer prescription and optionally, to attach a blocker element to the lens. For example, an Essilor Instruments Mr. Blue tracer.

In some embodiments, system 100 includes one or more lens holding jig 105. Where jig 105, in some embodiments, holds one or more lens in a known position and/or orientation for treating (e.g. by lens surface eroder 104) and/or printing e.g. by printer 106. In some embodiments, jig 105 includes one or more feature as illustrated in and/or described regarding jig 1405 FIG. 14.

In some embodiments, lens surface eroder 104 is a commercially available device configured to remove a specified and/or controlled area and/or depth portion of a lens. Where, in some embodiments, eroder 104 is capable of remove material from a specified region and/or position (e.g. based on data received by the eroder).

In some embodiments, eroder 104 includes a directable beam. Alternatively or additionally, in some embodiments, a mask is used for control of region/s to be eroded. In some embodiments, eroder 104 is a laser removal device e.g. a $CO_2$ laser removal device. For example, a laser removal device including a mirror reflection mechanism. For example a SEI 30 W $CO_2$ EASY laser.

Alternatively or additionally to laser material removal (or roughening of the surface), the surface may be otherwise treated (using a treatment device), for example, to modify adhesion properties thereof. In one example, a plasma beam, for example, generated by a TDK F Series Piezobrush PZ3 device, is used to modify surface properties. In one example, the PZ3 is used at a 18 W output with a flame of 2-10 mm in length and a width of 2-29 mm, for a time of, for example, between 0.1 and 10 seconds. Optionally or additionally, the plasma is applied until surface energy increases by, for example, between 10 and 40 mN/m, for example, between 10 and 20 mN/m. Optionally or additionally, the plasma is applied to increase the surface energy by between 10% and 90%, for example between 20% and 65%. Optionally or additionally, the plasma (or other treatment) is applied until surface energy is increased to above, for example, 40, 50, 60 or 70 mN/m (e.g., or less than 100) or intermediate values.

In another example, a water jet, optionally with abrasive material, is used for surface treatment.

In some embodiments, beam/s of the removal device are sufficiently small and/or applied gently enough so that the surface eroded by the beam/s appears smooth to the naked eye. A potential advantage of surface treatment is improving the adhesion of layers printed or otherwise attached thereto. The treatment may be optimized to match the needs of the layer or other material to be applied.

For example, in some embodiments, a treatment device removes and/or otherwise treats material according to pixels of an erosion plan. Where, in some embodiments, the pixels are sufficiently small and/or differences in material removal across a pixel are sufficiently small that eroded surface appears smooth. Where, for example, the surface roughness is at most 100 μm, or 50 μm, or 20 μm, or 5 μm, or 1 μm, or lower or higher or intermediate roughness.

In some embodiments, eroder 104 is able to remove selected portion/s of a lens the orientation of which the eroder is able to recognize using a blocker attached to the lens. In some embodiments, eroder 104 erodes by one or other process e.g. one or more of; water jet erosion, sand blasting, heat and/or fire treatment.

In some embodiments, printer 106 is able to print a desired pattern onto a desired region of a lens. Where orientation of the lens, in some embodiments, is recognized by printer 106 using the blocker attached to the lens and/or jig mounting. In some embodiments, printer 106 is a commercially available inject printer for printing onto glass and/or curved surfaces (e.g. configured to print onto glass bottles), for example, a Mimaki UJF-3042MKIIEX printer. Alternatively or additional to printer 106, in some embodiments, system 100 includes a material deposition device configured to deposit material (e.g. frame material) onto a lens.

In some embodiments, lens cutter 108 (also herein termed "edger") is configured to cut a lens to a desired shape, according to received glasses design data. The orientation of which lens, in some embodiments, is recognized by cutter 108 according to a blocker attached to the lens. In some embodiments, lens cutter 108 is a commercially available lens cutter e.g. an Essilor Mr.Orange Edger.

In some embodiments, drill 110 is a separate device, able to recognize an orientation of a lens and drill desired shape and/or size and/or positioned holes in a lens. In some embodiments, lens cutter 108 also is configured to provide these lens treatments, for example, an Essilor Mr.Orange Edger is able to drill holes within a lens.

In some embodiments, one or more of devices 101 are local to each other. For example, within a same room and/or building. A potential benefit being speed and/or ease of manufacture of a pair of glasses. In some embodiments, system 100 includes a plurality of one or more of devices 101, for example, potentially increasing speed of manufacture of multiple pairs of glasses.

In some embodiments, one or more of devices 101 receives data from a processor e.g. processor 120 and/or processor 118. Where, in some embodiments, device/s 101 perform lens treatment functions according to data received.

In some embodiments, system 100 includes computational circuitry for control of devices 101 local to the devices. Circuitry including and/or hosting one or more of a processor 120 and a memory 122.

In some embodiments, memory 122 stores customer data. In some embodiments, customer prescription/s and/or other data e.g. customer facial feature measurement/s e.g. previous custom glasses designs. For example, enabling production of replacement and/or switchable parts for previously purchased glasses. For example, enabling a customer to purchase additional glasses e.g. without being required to input previously inputted information.

In some embodiments, a processor manages glasses design information for a customer, e.g. the design information stored in memory 122 e.g. the processor managing a customer glasses wardrobe. In some embodiments, the processor uses the wardrobe information to produce customer tailored glasses design suggestions.

Alternatively or additionally to local processor 120, in some embodiments, system 100 includes one or more remote processor 118 e.g. cloud hosted.

In some embodiments, system 100 includes one or more user interface through which data is inputted and/or displayed.

For example, in some embodiments, data (e.g. customer prescription) is entered by an optometrist e.g. through an optometrist user interface 112. Which, in some embodiments, is local to manufacturing device/s 101 e.g. for ease and/or speed of manufacture of glasses.

For example, in some embodiments, data (e.g. glasses feature/s selection and/or a customer detail/s e.g. a photograph of the customer) is entered by a customer e.g. at a customer user interface 114.

In some embodiments, customer 114 and optometrist user interfaces 112 are combined.

In some embodiments, data entered is received by a memory 116 which, in some embodiments, is hosted (e.g. at least partially) by the cloud.

In some embodiments, processor 118 accessing memory 116 interacts with customer user interface 114 e.g. when responding to user inputs (e.g. generation of graphics of selected glasses options to be displayed to a user choosing custom eyewear). In some embodiments, processor 118, based on data received from a customer and/or optometrist, generates a glasses design. In some embodiments, a processor (e.g. processor 118 and/or processor 120), using the glasses design, generates control signals for one or more device 101 for manufacture of glasses according to the design.

In some embodiments, instructions for a technician are generated by the processor/s and are, in some embodiments, displayed at a manufacture user interface 124. For example, in some embodiments, a technician manually inputs control instructions into one or more device and/or manually moves a pair of glasses between devices. For example, in some embodiments, a technician manually selects glasses part/s and/or manually assembles the glasses. Where, in some embodiments, the technician is prompted by the manufacture user interface.

In some embodiments, system 100 includes a plurality of manufacturer user interface/s e.g. for use by one or more technician e.g. multiple technicians working together. In some embodiments, system 100 includes part identification circuitry, for example, a barcode and/or QR code scanner and/or RFID reader where, in some embodiments, lenses are tracked through manufacture using identifier/s (e.g. barcode, QR code, RFID) attached to and/or associated with the lens (e.g. in and/or on a lens container and/or packaging).

In some embodiments, movement of a lens from one or more portion of system 100 to another is automated.

For example, by an automated conveyer system.

For example, where, in some embodiments, robotic device/s remove lens/es from a first manufacturing device 101 and transfer the lens/es to a second manufacturing device. Where first manufacturing device and second manufacturing device should be understood to be any two manufacturing devices as described in this document e.g. regarding FIG. 1.

In some embodiments, a robotic arm (and/or end effector) moves a lens from a first manufacturing device 101 (e.g. after the first manufacturing device has processed the lens). Optionally, in some embodiments, for one or more transfer between manufacturing devices, the robotic arm transfers the lens to a second manufacturing device.

In some embodiments, a robotic arm (and/or end effector) moves a lens from a first manufacturing device to a robotic transport device which then moves the lens to a second manufacturing device. Where, in some embodiments, a robotic arm associated with the second manufacturing device loads the lens to the second manufacturing device.

In some embodiments, robotic arm/s have dedicated tasks, for example, one or more transfer and/or removal and/or loading task. For example, a robotic arm being dedicated to a manufacturing device where it removes a processed lens and loads a lens for processing.

In some embodiments, robotic arm/s perform a plurality of tasks, for example loading and/or unloading and/or transferring lens/es between manufacturing device/s.

In some embodiments, system 100 includes one or more additional device for adjustment of glasses arms and/or bridges. For example, a 3D printer for printing custom versions of these parts. For example, one or more cutter and/shaper for adjustment of size and/or change in shape. In some embodiments, the cutter and/or laser removal device are used to reduce a size and/or change a shape of arm/s and/or a nose bridge. In some embodiments, appearance of part/s (e.g. nose and/or arm bridge) is adjusted by deposition of material, e.g. the deposition including one or more feature as described regarding the lenses e.g. in some embodiments, printed onto the part.

Exemplary Methods

Figure 2:
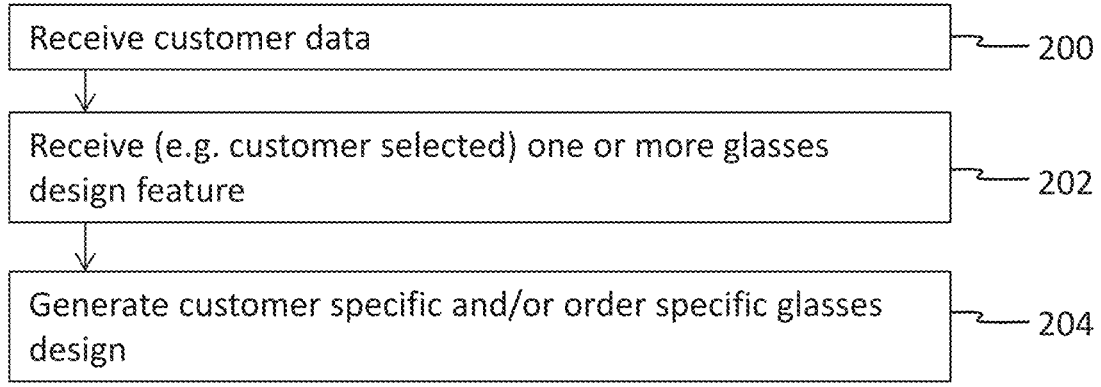

FIG. 2 is a method of glasses design, according to some embodiments of the invention.

At 200, in some embodiments, customer data is received.

In some embodiments, customer data includes a customer corrective prescription data. The prescription data including, for example, a sphere component and optionally cylinder component/s with axis/es associated with the cylinder component/s.

In some embodiments, customer data includes one or more customer facial characteristic, for example, one or more dimension of one or more portion of the customer's face and/or head. For example, a pupil distance PD. For example, a face extent in on one or more direction. For example, nose dimension/s. For example, ear size and/or shape and/or positioning on the head e.g. with respect to other facial features.

In some embodiments, customer data includes feature/s of customer coloring. For example, one or more of skin tone, hair color, eye color.

In some embodiments, customer data includes potentially frequently changed customer aesthetic information. For example, hair style, hair color, clothing, for example, in some embodiments, glasses design is tailored to a customer look e.g. including clothing worn, design e.g. according to step 204.

In some embodiments, customer facial characteristic/s and/or customer coloring are extracted from image/s of the customer. In some embodiments, customer data includes one or more ratio between dimensions of portion/s of the customer's face and/or head.

In some embodiments, customer data includes customer personal and/or medical information, for example, one or more of; age, sex, height, weight.

At 202, in some embodiments, one or more glasses design feature is received for example, as part of a glasses design. Where, in some embodiments, the glasses design has been generated e.g. including one or more feature as illustrated in and/or described regarding FIG. 8.

At 204, in some embodiments, based on one or more portion of the received customer data (e.g. as described regarding step 200) and the received one or more glasses design feature (e.g. as described regarding step 202), a customer specific and/or order specific glasses design is generated.

In some embodiments, a glasses design includes one or more of a shape and/or size of lenses, a type of lenses, an orientation of each lens, a position of the lens shapes to be cut with respect to the uncut lenses, a frame design file for printing onto the lens, a hole drilling map, identifiers for additional part/s (e.g. arm part/s and/or nose bridge part/s where a design includes a reference to a part selection from a range of standard parts), and lens treatment/s. In some embodiments, the glasses design includes size and/or shape and/or color of a nose bridge and/or arm. Where, in some embodiments, the arm/s and/or nose bridge are customized e.g. sized and/or shaped and/or colored according to the glasses design.

Where, in some embodiments, the frame design file includes one or more of; size and/or shape of the frames, position of the frames on the lens (e.g. cut and/or un-cut), print design e.g. color and/or pattern e.g. a map for each inkjet pixel. In some embodiments, the bridge and/or arm/s are customized by adhering material e.g. printing onto the part e.g. according to a print design.

Where, in some embodiments, one or more glasses design feature as selected by the customer is adjusted based on customer data (e.g. received at step 200). For example, in some embodiments, lens and/or frame size and/or shape are adjusted using customer data. For example, where, in some embodiments, drill hole positioning and/or additional part/s identifiers are adjusted using customer data. Where adjustment, in some embodiments, includes one or more feature as illustrated in and/or described regarding FIG. 12.

Figure 3:
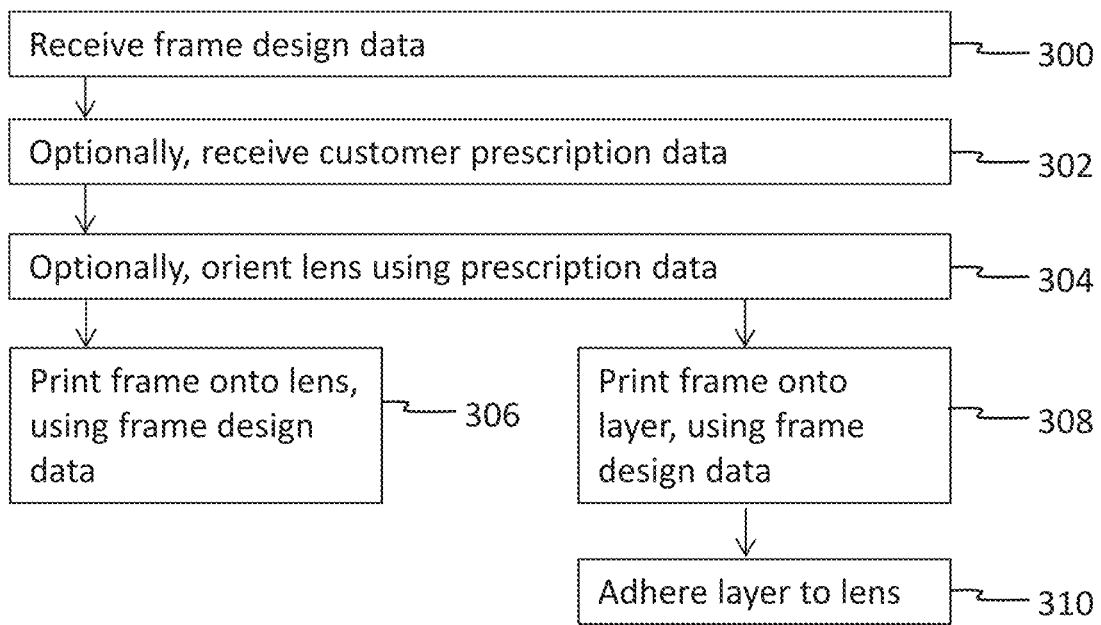

FIG. 3 is a method of glasses manufacture, according to some embodiments of the invention.

At 300, in some embodiments, frame design data is received. In some embodiments, the frame design data includes one or more of size, shape, color, and pattern of a glasses frame to be printed on a lens.

At 302, optionally, in some embodiments, customer corrective prescription data is received. Where, in some embodiments, customer prescription data includes one or more feature of prescription data as described regarding step 202 FIG. 2. In some embodiments prescription data includes one or more lens feature, for example one or more of; lens material, lens index, and lens coating/s.

At 304, in some embodiments, a lens selected according to data received at 302 is orientated, using the data received. For example, by a lens orienting device e.g. including one or more feature as illustrated and/or described regarding lens orientating device 102 FIG. 1.

At 306, in some embodiments, a frame is attached and/or adhered to the centered lens, using frame design data received at step 300. Where, in some embodiments, the frame is printed onto one or more surface of the lens.

At 308, alternatively or additionally to step 306, frame material is applied to a layer. For example, frame material is printed onto the layer. In some embodiments, the layer has optical power and is selected and/or orientated (e.g. prior to application of frame material), for example, along with the lens, according to the customer prescription data.

At 310, in some embodiments, the layer is applied to the lens, for example, is adhered to the lens.

Figure 4:
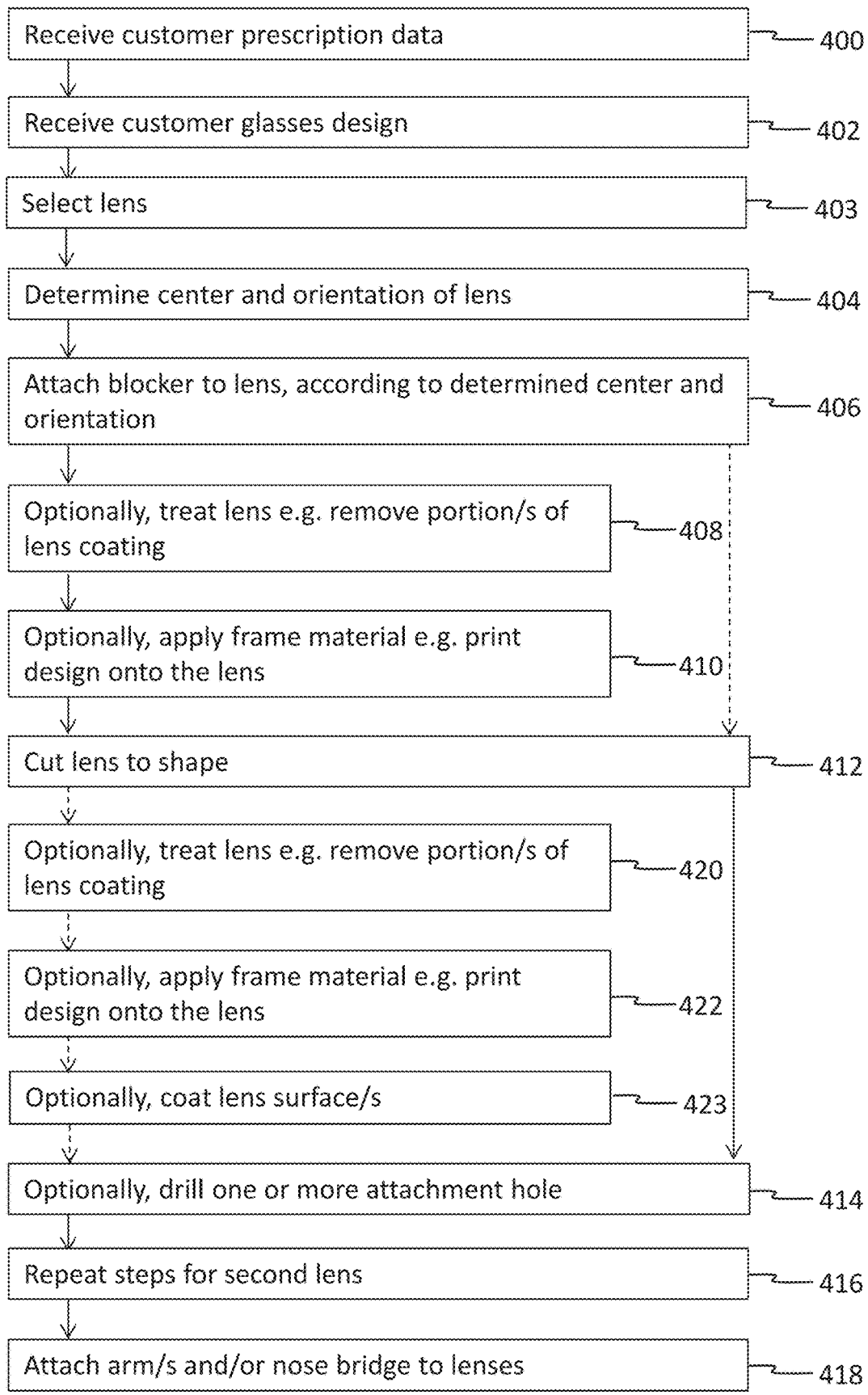

FIG. 4 is a detailed method of glasses manufacture, according to some embodiments of the invention.

At 400, optionally, in some embodiments, customer corrective prescription data is received. Where, in some embodiments, customer prescription data includes one or more feature of prescription data as described regarding step 202 FIG. 2. In some embodiments prescription data includes one or more lens feature, for example one or more of; lens material, lens index, and lens coating/s.

At 402, in some embodiments, customer glasses design data is received.

Where, in some embodiments, customer glasses design data includes frame design data, according, for example, one or more feature of frame design data as described regarding step 300 FIG. 3.

In some embodiments, customer glasses design data includes one or more feature as described regarding step 204 FIG. 2.

At 403, in some embodiments, a lens is selected according to customer prescription data. Also according to glasses design data e.g. index of lens selected using lens size and/or shape and/or lack or presence of frames.

At 404, in some embodiments, a center and desired orientation of the lens is determined. For example, using a lens orienting device e.g. lens orientating device 102 FIG. 1.

At 406, in some embodiments, a blocker is attached to the lens, according to the desired positioning of the lens center and desired orientation of the lens. For example by a lens orientating device (e.g. lens orientating device 102 FIG. 1, e.g. lens orientating device 502 FIG. 5A, e.g. lens orientating device 1302 FIG. 13).

In some embodiments, the blocker is attached to the lens using adhesive e.g. wax and/or glue.

In some embodiments, the blocker enables a technician and/or manufacturing device to orient the lens correctly e.g. prior to further treatment e.g. when coupling the lens to a jig. For example, in some embodiments, the blocker in asymmetrical and/or includes one or more marking.

Figure 6A:
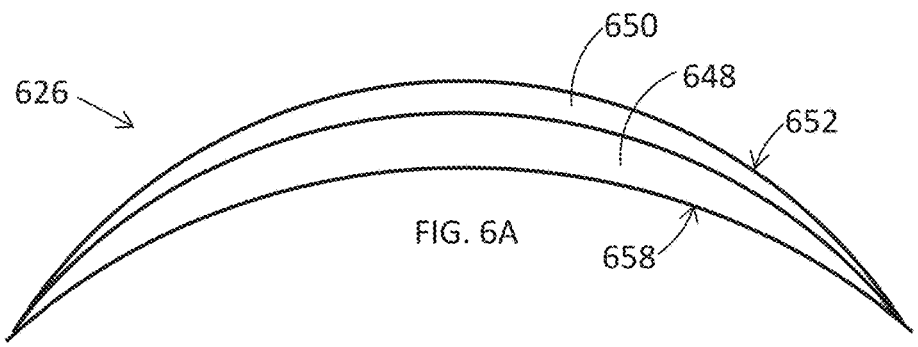

In some embodiments, a blocker is attached to a surface of a side (e.g. one of sides 652, 658 FIG. 6A) of a lens (e.g. lens 626 FIG. 6A). In some embodiments, the side to which the blocker is attached is an opposing side to the side which is then treated and/or has material adhered to it. So, referring to FIGS. 6A-G, in some embodiments, a blocker is attached to side 658. The blocker being attached so that, now referring to FIG. 14, when the lens is coupled to jig 1405 by the blocker being coupled to a holder 1462, the lens surface to be printed onto is not blocked and/or covered by the blocker and/or is facing upwards e.g. to receive treatment and/or frame material.

In some embodiments, where treatment is to be performed to and/or material is to be applied to a first side of the lens to which a blocker is attached (for example, where the attachment of a first blocker is automatically performed by a device to a first side of the lens), a second blocker is attached to a second side of the lens. In some embodiments, the first blocker is removed before attachment of the second blocker (e.g. positioning of the second blocker being guided by one or more mark made using the first blocker). In some embodiments, a center position for a blocker is marked using a mechanical handle which e.g. is adhered to the lens.

In some embodiments, position and/or orientation of the second blocker is manual, by a person adhering the second blocker, e.g. using a position and/or orientation of the first blocker. In some embodiments, positioning and/or orientating with respect to the lens and/or adhering the second blocker to the lens is performed using a device e.g. automatically.

Optionally, the first blocker is then removed prior to treatment and/or application of material (e.g. by printing) onto the first side of the lens. In some embodiments, the attachment of a second blocker and/or removal of the first blocker is after treatment and/or application of material (e.g.

frame material by printing) to the second side of the lens, for example, producing a lens with treatment to and/or material applied to both sides.

At 408, optionally, in some embodiments, the lens is treated.

Optionally, in some embodiments, prior to treatment and/or printing, the lens (and/or more than one lens e.g. both lenses for a pair of glasses) are attached to a jig. The jig, in some embodiments, including one or more feature as illustrated in and/or described regarding jig 1405 FIG. 14. In some embodiments, the lens/es are attached to the jig prior to treating and removed after printing.

In some embodiments, treatment includes removing a portion of the lens. For example, a portion of a coating layer of the lens. In some embodiments, a portion of the lens which will become a base for frame material is treated to remove material.

In some embodiments, a specified and/or controlled area and/or depth portion of a lens is removed e.g. according to the glasses design. Where, in some embodiments, removal of material from a specified region and/or position is by a controllable beam directed at the lens. Additionally and/or alternatively, in some embodiments, a mask is used to direct removal of material to a desired region and/or location.

In an exemplary embodiments, the material is laser removed e.g. by a $CO_2$ laser. In some embodiments, the removal leaves a depression on a surface of lens. Optionally or additionally, the surface is treated by a different treatment device, for example, a plasma surface treatment beam for surface adhesion properties modification. Such surface treatment may not create a noticeable depression, but optionally changes the chemical surface properties of such region.

In some embodiments, laser removal is by a laser in a fixed position (in one or more dimension) where the lens remains in a fixed orientation with respect to the laser. For example, where the laser moves (e.g. to access different surfaces of the lens) in a plane perpendicular to a direction of lasing with respect to a stationary lens.

In some embodiments, an orientation of the lens with respect to the laser is changed. For example, where an angle of incidence of the laser with respect to the lens surface which is being lased is controlled. For example, maintained within a desired range, e.g. between 60-90, or 70-90, or 80-90, or maintained at about 90 degrees of a planar tangent to the surface of the lens which is being lased. In some embodiments, the laser is moved with respect to the lens. In some embodiments, both the lens and the laser are moved. In an exemplary embodiment, orientation of the lens alone is moved with respect to the laser which maintains a lasing direction (though a position of lasing, in some embodiments is changed in a plane). Where, in some embodiments, the lens orientation is changed by a robotic arm which manipulates the lens.

In some embodiments, lens/es are manipulated by being grasped by a robotic arm by suction at the arm attaching the lens to the arm.

In some embodiments, lens/es are manipulated by being grasped by a robotic end effector e.g. grasped between two portions of the end effector.

At 410, optionally, in some embodiments, frame material is applied and/or adhered to the lens.

In some embodiments, frame material is applied when the frame is coupled to a jig e.g. jig 1405 FIG. 14. In some embodiments, the jig holds the lens in a known position and/or orientation with respect to a device (e.g. printer) applying material to the lens.

In some embodiments, application and adhering are one step e.g. when application is by printing onto the lens. In some embodiments, application and adhering are different steps where, in some embodiments, material is fixed by an additional step (e.g. heat treatment).

In some embodiments, depositing and/or adhering material to the lens (and/or other portion of the glasses) is by a directable applicator e.g. inkjet head. In some embodiments, alternatively or additionally, where deposition is controlled using a mask and/or by applying a material which is a desired size and/or shape (e.g. adhering a transfer).

In an exemplary embodiment, the printing is inkjet printing. Where inkjet printing, in some embodiments, is defined as including propelling ink droplets (e.g. from an ink reservoir) onto a substrate. In some embodiments, applying (e.g. printing) of the material is according to a glasses design (e.g. as described regarding FIG. 2) and/or frame design data (e.g. as described regarding FIG. 3).

In some embodiments, printing is by printing head/s (e.g. inkjet print head) in a fixed position (in one or more dimension) where the lens remains in a fixed orientation with respect to the printing head. For example, where the printing head moves (e.g. to access different surfaces of the lens) in a plane perpendicular to a direction of printing with respect to a stationary lens.

In some embodiments, an orientation of the lens with respect to the printing head/s is changed. For example, where an angle of incidence of the print head with respect to the lens surface which is being printed onto is controlled. For example, maintained within a desired range, e.g. between 60-90, or 70-90, or 80-90, or maintained at about 90 degrees of a planar tangent to the surface of the lens which is being printed onto. In some embodiments, the print head is moved with respect to the lens. In some embodiments, both the lens and the print head are moved. In an exemplary embodiment, orientation of the lens alone is moved with respect to the print head which maintains a printing direction (though a position the print head, in some embodiments is changed in a plane). Where, in some embodiments, the lens orientation is changed by a robotic arm which manipulates the lens.

In some embodiments, frame material is applied to portion/s of the lens treated at step 408. In some embodiments, frame material fills depression/s on the lens surface e.g. where the depression/s were formed during treatment.

Figure 6B:
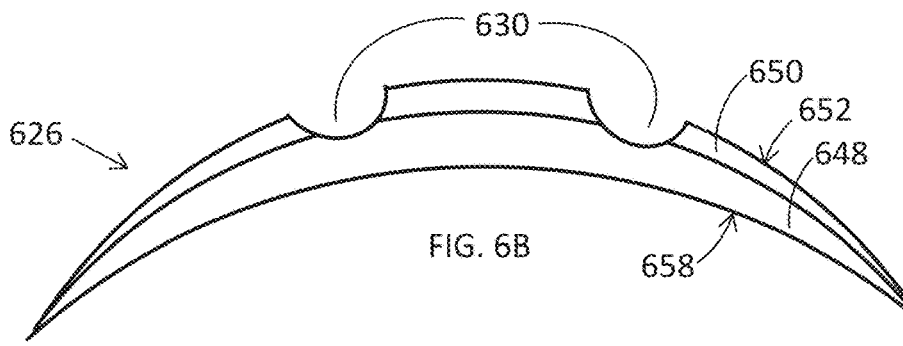
Figure 6C:
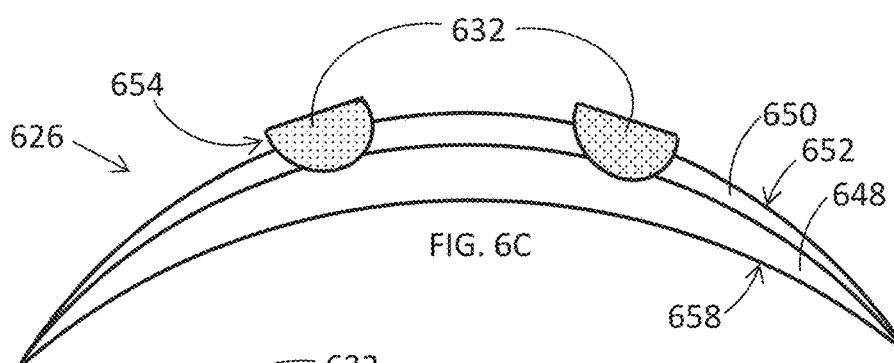

In some embodiments, sufficient material is applied to have the frame material protrude above a contour of a surface of the lens (e.g. as described regarding FIG. 6C).

In some embodiments, one or more portion of the frame is 3D printed e.g. potentially giving frames a raised appearance above the lens surface and/or forming edges of frames surrounding an edge of the lens.

In some embodiments, treating and printing are used to provide an aesthetic effect. For example, in some embodiments, treatment is used to produce a textured surface on the lens. Where, in some embodiments, printing is selectively onto the treated surface. For example, in some embodiments, treatment includes removing different depths of lens material, and printing is into area/s with different depth (e.g. into recession/s).

In some embodiments, steps 408 and/or 410 are not performed, the method proceeding directly to cutting of the lens at 412. In some embodiments, for example, if steps 408 and/or are not performed, steps 420 and/or 422 are performed.

At 412, in some embodiments, the lens is cut to a desired shape according to the received customer glasses design data.

In some embodiments, steps 410 and 412 are reversed, where the lens is first cut to the desired shape, and then the lens is printed onto.

At 420, in some embodiments, optionally, the lens is treated. For example, according to one or more feature as described regarding step 408.

At 422, in some embodiments, optionally, frame material is applied to the lens. For example, according to one or more feature as described regarding step 410.

A potential advantage of cutting the lens to shape prior to treating and/or printing is that treating and/or cutting are less likely (and/or to a lesser extent) affect the surface of the lens after treatment and/or printing e.g. the aesthetic qualities of the printing.

A further potential advantage of cutting the lens to shape prior to treating and/or printing is a reduced size of the lenses e.g. in both directions potentially enabling higher accuracy of treating and/or printing. Where, for example, cutting the lens reduces a height of the lens associated with curvature of the lens.

Optionally, at 423, in some embodiments, (e.g. after frame material is applied) the lens is coated. For example, to protect and/or strengthen the lens. The coating, for example, including one or more of antireflective coating, scratch preventative coating and/or one or more other coating as known in the art of lens coating. In some embodiments, the coating layer is at least partially provided by adhering a layer of material (e.g. a sticker) to the lens. Where the layer provides mechanical strength to and/or changes optical properties of the lens.

At 414, optionally, in some embodiments, one or more hole is drilled in the lens. This step, in some embodiments, is performed prior to coating application in step 423. For example, at least a first hole positioned on a first edge region of a lens e.g. for attachment of a nose piece to the lens. For example, at least a second hole positioned on a second edge region of the lens e.g. for attachment of an arm to the lens. Where, in some embodiments, the first and second sides of the lens are opposite regions at an edge of the lens. Where, opposite, in some embodiments, is defined as being where a straight line connecting the regions passes through a center of the lens, in one or more dimension.

At 416, in some embodiments, steps 403-414 are performed for a second lens. In some embodiments, each lens is treated according to a plurality of steps before the second lens is treated. In some embodiments, one or more of the steps are performed for both lenses before moving to a subsequent step.

At 418, in some embodiments, the lenses are attached to each other to form a pair of glasses. Where, in some embodiments, the lenses are attached by a nose piece which is attached at a first and a second region of the nose piece to a first and second lens respectively. In some embodiments, one or more arm is attached to the lenses e.g. an arm to each lens.

In some embodiments, the nose bridge and/or arms are selected from a range of pre-produced options. In some embodiments, the nose bridge and/or arms are adjustable.

In some embodiments, step 403 includes selecting a lens lacking coating/s. Where the lack is of coating material which interferes with adherence of frame material to the surface of the lens. In some embodiments, steps 408 and/or 420 are not performed. In some embodiments, at step 423 e.g. where the lens lacks coating/s, coating layer/s are then applied to one or more surface of the lens e.g. after frame material has been applied.

FIGS. 5A-B are simplified schematics illustrating manufacture of a pair of glasses 546, according to some embodiments of the invention.

In some embodiments, in glasses manufacture according to various embodiment/s, a lens 526 proceeds through steps illustrated in FIGS. 5A-B.

Referring now to FIG. 5A, in some embodiments, lens 526 is attached to a blocker 528 using a lens orientating device 502. Where lens orientating device 502 includes one or more feature of lens orientating device 102 FIG. 1. Where attachment includes one or more feature as described regarding steps 404 and/or 406 FIG. 4.

In some embodiments, prior to treating and/or printing, lens 526 is coupled to a jig e.g. jig 1405, FIG. 14.

In some embodiments, a portion of a surface of a side (or both sides) of a lens 526 is treated. In some embodiment, the side which is to become an anterior surface of the lens (e.g. furthest away from the user's eye surface) when worn as glasses is treated. Alternatively or additionally, in some embodiments, the side which is to become a posterior surface of the lens (e.g. closest to the user's eye surface) when worn as glasses.

In some embodiments, treatment includes removing at least a portion of a coating and/or surface layer on a side of lens 526 and/or surface adhesion modification. In some embodiments, removal is using a laser removal device 504. Where laser removal device 504, in some embodiments, includes one or more feature of laser removal device 104 FIG. 1 and/or where the removal includes one or more feature as described regarding step 408 FIG. 4. Optionally or additionally, surface treatment is by a plasma beam, for example, cold plasma, for example, to make the treated area more adherable-to.

In some embodiments, a frame 532 is printed onto lens 526, for example, using a printer 506. In some embodiments, printing is onto a region of the depression 530 previously cut into lens 526. In some embodiments, printer 506 includes one or more feature as described regarding printer 106 FIG. 1. In some embodiments, printing includes one or more feature as described regarding step 410 FIG. 4.

Referring now to FIG. 5B, in some embodiments, lens 526 is cut to shape and, in some embodiments, one or more hole are cut (and/or drilled) in lens 526. In some embodiments, cutting and/or drilling are performed using a cutter 508. Where cutter 508, in some embodiments, includes one or more feature as described regarding cutter 108 and/or drill 110 FIG. 1. Where, in some embodiments, cutting of the lens 526 to shape includes one or more feature as described regarding step 412 FIG. 4. Where, in some embodiments, cutting and/or drilling hole/s 536, 538 in lens 526 includes one or more feature as described regarding step 414 FIG. 4.

In some embodiments, cutting follows application of frame material (and optionally adhering of the material) to the lens. Cutting after application of the frame material potentially eases requirements on positioning of the frame material e.g. where the frame is to extend to an edge of the lens and/or has a specified spatial relationship with the lens. Where, in some embodiments, optical feedback is used by the cutter to position the lens and/or cut along a desired trajectory with respect to the frame material and/or lens.

In some embodiments, blocker 528 is then removed.

In some embodiments, additional parts are provided, for example, one or more arm 542, a bridge 544, and a second lens 540 processed e.g. according to one or more feature as described regarding the processing of lens 526. In some embodiments, the parts are attached e.g. adhered and/or connected using one or more connector (e.g. screw) to produce a pair of glasses 546.

FIG. 13 is a simplified schematic illustrating manufacture of a pair of glasses 546, according to some embodiments of the invention.

In some embodiments, in glasses manufacture according to various embodiment/s, a lens 1326 proceeds through steps illustrated in FIG. 13.

In some embodiments, lens 1326 is attached to a blocker 1328 using a lens orientating device 1302. Where lens orientating device 1302 includes one or more feature of lens orientating device 102 FIG. 1. Where attachment includes one or more feature as described regarding steps 404 and/or 406, FIG. 4.

In some embodiments, lens 1326 is cut to shape and, in some embodiments, one or more hole are cut (and/or drilled) in lens 1326. In some embodiments, cutting and/or drilling are performed using a cutter 1308. Where cutter 1308, in some embodiments, includes one or more feature as described regarding cutter 108 and/or drill 110 FIG. 1. Where, in some embodiments, cutting of the lens 1326 to shape includes one or more feature as described regarding step 412 FIG. 4. Where, in some embodiments, cutting and/or drilling hole/s 1336, 1338 in lens 1326 includes one or more feature as described regarding step 414 FIG. 4. In some embodiments, optical feedback is used by the cutter to position the lens and/or cut along a desired trajectory with respect to the lens.

In some embodiments, prior to treating and/or printing, lens 1326 is coupled to a jig e.g. jig 1405, FIG. 14.

In some embodiments, a portion of a surface of a side (or both sides) of a lens 1326 is treated. In some embodiment, the side which is to become an anterior surface of the lens (e.g. furthest away from the user's eye surface) when worn as glasses is treated. Alternatively or additionally, in some embodiments, the side which is to become a posterior surface of the lens (e.g. closest to the user's eye surface) when worn as glasses.

In some embodiments, treatment includes removing at least a portion of a coating and/or surface layer on a side of lens 1326. In some embodiments, removal is using a laser removal device 1304. Where laser removal device 1304, in some embodiments, includes one or more feature of laser removal device 104 FIG. 1. Where the removal includes one or more feature as described regarding step 420 FIG. 4.

In some embodiments, a frame 1332 is printed onto lens 1326, for example, using a printer 1306. In some embodiments, printing is onto a region of the depression 1330 previously cut into lens 1326. In some embodiments, printer 1306 includes one or more feature as described regarding printer 106, FIG. 1. In some embodiments, printing includes one or more feature as described regarding step 422, FIG. 4.

In some embodiments, blocker 1328 is then removed.

In some embodiments, additional parts are provided, for example, as described regarding FIG. 5B, for example, one or more arm 542, a bridge 544, and a second lens 540 processed e.g. according to one or more feature as described regarding the processing of lens 526. In some embodiments, the parts are attached e.g. adhered and/or connected using one or more connector (e.g. screw) to produce a pair of glasses e.g. as illustrated in FIG. 5B—glasses 546.

FIGS. 6A-G are simplified schematic cross sections of a lens 626, illustrating manufacture steps, according to some embodiments of the invention.

In some embodiments, in glasses manufacture according to various embodiment/s, a lens 626 proceeds through steps illustrated in FIGS. 6A-E. Where, for example, the lens is treated and/or material is applied to the lens, before the lens is cut to shape.

Figure 6D:
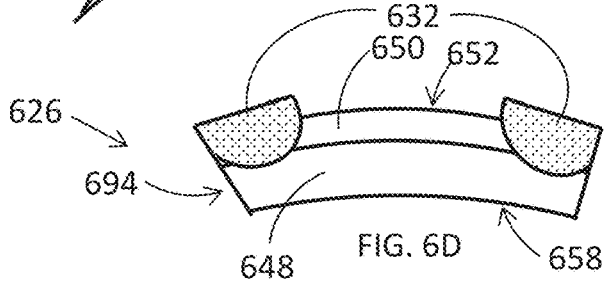
Figure 6F:
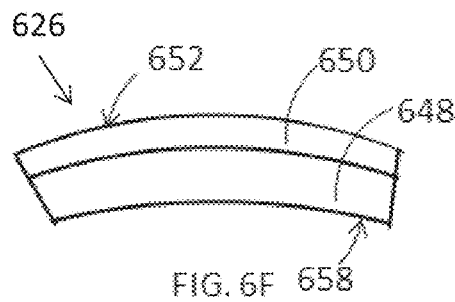
Figure 6E:
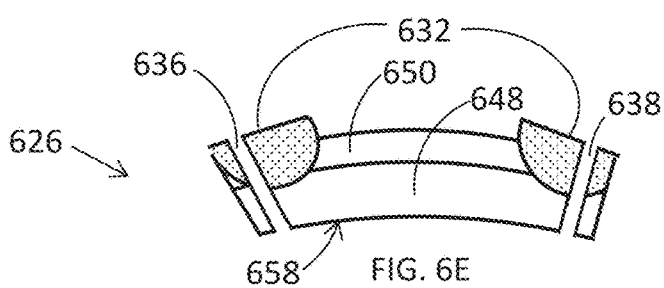
Figure 6G:
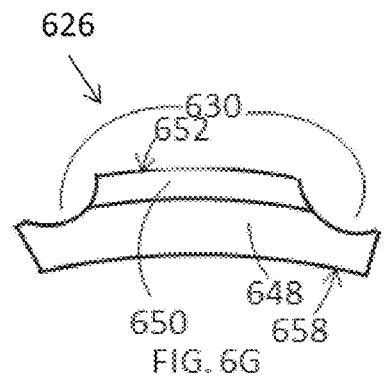

In some embodiments, in glasses manufacture according to various embodiment/s, a lens 626 proceeds through steps (e.g. sequential steps) as illustrated by FIG. 6A, then FIG. 6F, then FIG. 6G, then FIG. 6D, and then FIG. 6E. Where, for example, the lens is cut to shape prior to being treated and/or application of material.

Referring now to FIG. 6A, in some embodiments, lens 626 includes at least two layers 648, 650. In some embodiments, lens 626 includes a first surface 652 and a second surface 658. Where, depending on the customer's prescription the surfaces 652, 658 are posterior or anterior e.g. as described elsewhere in this document. It should be understood that the shapes of lens 626 illustrated in FIGS. 6A-G are exemplary and other shapes of optical lens are envisioned and encompassed by the invention. In some embodiments, curvature of first surface 652 and/or of second surface 658 is 0-15 diopters, or 0.25-15 diopters, or 0.25-10 diopters or lower or higher or intermediate curvatures or ranges.

In some embodiments, a first layer 648 includes light refracting reflective transparent material. In some embodiments, a second layer 650 includes antireflective material and/or scratch preventing material. In some embodiments, second layer 650 and/or an additional layer includes light blocking material, for example, a sunglasses tint and/or polarized light blocking material.

In some embodiments, first layer 648 is 0.5 mm-4 mm, or 0.5 mm, -2 mm, or lower or higher or intermediate thicknesses or ranges.

In some embodiments, second layer 650 is 100 nm-50 µm, or 100 nm-10 µm, or 200 nm-1 µm, or 200 nm-500 nm, or lower or higher or intermediate thicknesses or ranges.

Referring now to FIG. 6B, in some embodiments, a portion of a surface 652 of lens 626, for example, a portion of lens 626 (e.g. a portion of second layer 650) is removed, e.g. according to one or more feature as described regarding step 408 FIG. 4. In some embodiments, the removing of material transfers lens 626 from the configuration illustrated in FIG. 6A to that illustrated in FIG. 6B. Where, in some embodiments, removal of the portion leaves one or more depression 630 in lens surface 652.

Referring now to FIG. 6C, in some embodiments, material 632 is applied onto lens surface 652, for example, at a region of depression/s 630. Where the application, in some embodiments, transfers lens 626 from the configuration illustrated in FIG. 6B to that illustrated in FIG. 6C. Where, in some embodiments, the application is according to one or more feature of step 410 FIG. 4. In some embodiments, frame 632 material is printed onto lens 626.

In some embodiments, frame material 632 protrudes 654 above a contour of lens surface 652. By, for example, a thickness of 0.01-1 mm, or of 0.1-1 mm, or of 0.1-0.5 mm, or lower or higher or intermediate thicknesses or ranges.

In some embodiments, frame material is 3D printed onto lens surface 652, where a thickness of the frame material above a contour of the lens surface is 0.1-3 mm, or 1-3 mm, or lower or higher or intermediate thicknesses or ranges.

In some embodiments, a frame is printed onto a lens where the frame surrounds at least one edge of the frame. In some embodiments, a front portion of a glasses frame is printed onto the lenses, for example, including a nose bridge portion connecting the lenses. In some embodiments, other portion/s of the glasses are 3D printed, e.g. separate nose portion and/or arms.

Referring now to FIG. 6D, in some embodiments, lens 626 is cut 412. Where cutting, in some embodiments, transfers lens 626 from the configuration illustrated in FIG. 6C to that illustrated in FIG. 6D. Cutting reduces a size of lens 626 and/or changes a shape of lens 626. The cutting, in some embodiments, is according to one or more feature of step 412 FIG. 4.

In some embodiments, positioning of frame material 632 on lens 626 and/or positioning of cutting of lens is such that (e.g. cuts pass through a region of lens onto which frame material has been deposited) an edge surface 694 of the cut lens 626 includes frame material. Where, in some embodiments, edge surfaces 694, along with first and second surfaces 652, 658, delineate an outer contour of lens 626.

Referring now to FIG. 6E, in some embodiments, one or more hole 636, 638 is cut and/or drilled at least partially through lens 626 (e.g. entirely through as illustrated in FIG. 6E). Where the cutting and/or drilling of hole's, in some embodiments, transfers lens 626 from the configuration illustrated in FIG. 6D to that illustrated in FIG. 6E. In some embodiments, cutting and/or drilling of hole/s 635, 638 is according to one or more feature as described regarding step 414 FIG. 4.

Referring now to FIG. 6F, in some embodiments, for example as described elsewhere in this document, lens 626 is cut to shape prior to treating and/or applying of material (e.g. frame material). A potential advantage of which, in some embodiments, is treating and/or applying material to a smaller sized lens, in one or more dimension (e.g. width as measured between surfaces 652, 658).

Referring now to FIG. 6G, in some embodiments, for example, as described elsewhere in this document, lens 626 (e.g. after cutting and/or prior to application of material) is treated to remove material leaving recession/s 630.

FIG. 19 is a method of frame adjustment, according to some embodiments of the invention.

At 1900, in some embodiments, lens parameter/s are received. For example, including a corrective prescription, a curvature of one or more side of the lens, the index of the lens material, lens coating/s. In some embodiments, the lens parameter/s are received for one or both lenses of a pair of glasses.

In some embodiments, the lens parameter/s include imputed data. In some embodiments, the lens parameter/s are received from measurement/s collected from the physical lens itself (or lenses). Where, in some embodiments, the lens is scanned e.g. optically e.g. laser scanning e.g. where one or more image of the lens is acquired. Where, in some embodiments, measurements include one or more of measurement/s of curvature of one or more portion of one or more side of the lens, and measurement/s optical index of material of the lens (e.g. for one or more portion of the lens).

At 1902, in some embodiments, frame design data (e.g. as described elsewhere in this document) is received.

At 1904, in some embodiments, the frame design data is adjusted, based on received lens parameter/s.

For example, where frame material is applied to a side of the lens proximal to the user's eye, frame design data is adjusted to compensate for visual distortion of applied frame material associated with the lens shape and/or optical power.

Where, for example, size and/or shape of the frame and/or patterning of the frame material is adjusted, based one received lens parameter/s. For example, to maintain an external visual appearance of the frame, independent of the lens/es used (e.g. independent of lens prescription and/or curvature and/or index of the lens).

In some embodiments, the adjusting is using a look-up table. For example, in some embodiments, each frame shape (e.g. of a plurality of frame shapes e.g. 2-50, 5-20, 7-15, or 12, or lower or higher or intermediate numbers or frame shapes) is adjusted for a subrange of potential corrective prescriptions. Where, in an exemplary embodiment, each frame shape includes three frame designs, e.g. for negative and positive corrective prescriptions. For example, one for low negative corrective prescriptions (e.g. 0.00 to −3.00 diopters), one for mid-range negative corrective prescriptions (e.g. −3.00 to −6.00 diopters), and one for high negative corrective prescriptions (e.g. −6.00 to −9.00 diopters). For example, one for low positive corrective prescriptions (e.g. 0.00 to +3.00 diopters), one for mid-range positive corrective prescriptions (e.g. +3.00 to +6.00 diopters), and one for high positive corrective prescriptions (e.g. +6.00 to +9.00 diopters).

In some embodiments, the adjusting is using automatic algorithm/s.

In some embodiments, a look-up table is used to provide initial adjustment and an iterative process is used, for example, applying one or more algorithm to finalize (e.g. fine-tune the adjustment).

Exemplary Glasses Frame

FIG. 7A is a simplified schematic of a lens 726 with a frame 790a, according to some embodiments of the invention.

FIG. 7B is a simplified schematic of a lens 726 with a frame 790b, according to some embodiments of the invention.

FIG. 7C is a simplified schematic of a lens 726 with a frame 790c, according to some embodiments of the invention.

FIGS. 7A-C illustrate, for simplicity, a square shaped lens 726, with different frames 786a, 786b, 786c.

FIG. 7A and FIG. 7C illustrate the lens 726 with a partial frame 732a, 732b. FIG. 7B illustrates lens 726 with a full frame 732b extending around an entirety of a circumference of lens 726.

Where partial frames extend around an edge portion of a circumference of the lens. Where the circumference is defined as a measurement of a length of the outer edge of the lens. In the embodiment, illustrated in FIGS. 7A-C, the circumference of lens 726 is calculated as 2×(length 790+ width 792).

Where, in the embodiment illustrated in FIG. 7A, frame 732a is disposed extending to an edge of lens 726. Where, in the embodiment, illustrated in FIG. 7C, frame 732c is disposed at a separation 794 from an edge of lens 726. In some embodiments, the frame is disposed on the lens at a separation 794 of at most 0.1-3 mm from the lens edge, for one or more portion of the frame. Although, in FIG. 7C this separation is illustrated as constant along a length of frame 732c, it should be understood that varying separations are also encompassed and envisioned.

Exemplary Customer-Tailored Glasses

FIG. 8 is a method of generating a customer tailored glasses design, according to some embodiments of the invention.

At 800, in some embodiments, customer data is received. For example, according to one or more feature as described regarding step 200 FIG. 2.

At 802, in some embodiments, feature choices are displayed to a customer. In some embodiments, a menu of feature choices are displayed. In some embodiments, the display is based on and/or adjusted using the customer data received at step 800. For example, in some embodiments, ordering of display of feature/s is adjusted and/or aesthetics of the display are adjusted for the specific customer. For example, in some embodiments, choices are limited (e.g. less choices are displayed) by customer data e.g. certain features are not available for adjustment for certain prescriptions and/or customer facial feature size/s.

At 804, in some embodiments, a customer selects a feature from the menu.

At 806, in some embodiments, options are displayed for the selected feature. Where, in some embodiments, the display is based on the customer data received at step 800 and/or where, in some embodiments, the display is based on previous selection/s e.g. selected at 804. For example, in some embodiments, based on a lens shape and/or corrective prescription, certain frame options are given preference and/or are recommended and/or frame options are restricted. For example, where a customer has a high correction, lenses may be thicker (e.g. at edges of the lenses) making certain frame styles less or more aesthetically pleasing and/or functional (e.g. weight).

For example, in some embodiments, ordering and/or display feature/s are adjusted for the specific customer. For example, in some embodiments, feature options are limited (e.g. less options are displayed) and/or ordered based on customer data e.g. certain options are not available for adjustment for some prescriptions and/or customer facial feature size/s.

In some embodiments, one or more feature option is generated based on the customer data. For example, in some embodiments, shape and/or size and/or color of a feature is adjusted using customer data. Where, in some embodiments, the customer is presented with a range of options where more than one of the options e.g. each of the options, have been tailored to the customer. In some embodiments, customer preferences are "learnt", for example, future options being customized based on customer viewing (e.g. order, which options are viewed) and/or selection of previously presented options.

Where, in some embodiments, tailoring includes size and/or shape and/or color of one or more feature e.g. lens, frame, arm, bridge.

At 808, in some embodiments, the user selects a feature option.

At 810, optionally, in some embodiments, a graphical representation of the product with selected feature/s is displayed to the user e.g. one or more images e.g. a 3D model e.g. allowing the customer to view the product from different directions and/or at different angles.

In some embodiments, display includes a graphical representation of the customer, for example, a graphical representation of a view of the customer wearing the product. In some embodiments, an image of the designed glasses is superimposed on an appropriately scaled image of the customer. In some embodiments, a 3D model of the customer (e.g. of the customer's head) is used e.g. along with a 3D model of the designed glasses. Where, in some embodiments, the 3D models are used to provide different views of the product and/or to enable a user to select views e.g. manipulate the 3D representation.

At 812, in some embodiments, the customer is returned to step 802, for example, if the customer has not selected sufficient features. Where, in some embodiments, a customer is required to select an option for each of plurality of features.

In some embodiments, the customer responds as to whether they are finished. For example, in some embodiments, upon having chosen options for each obligatory feature, the customer, in some embodiments, based on the display at step 810, decides to finish e.g. to proceed to purchase the selected and/or displayed style. In some embodiments, the customer selects to continue selecting feature/s (e.g. replacing those already selected), returning to step 802. In some embodiments, if a customer has not specified a choice for a feature a standard feature is used or a feature matching selected features is determined and/or used (e.g. in step 814).

At 814, in some embodiments, based on customer selected of options for features and, optionally, customer data, a glasses design is generated.

Optionally, in some embodiments, a glasses design is generated along with one or more clothing design. For example, where design/s for matching clothing (e.g. with the same print) are generated. In some embodiments, the glasses design is provided with a selection of standard garments which match the glasses design. In some embodiments, the glasses themselves are provided as a kit including one or more garment selected and/or manufactured to match the glasses.

FIGS. 9A-G are simplified schematics of a GUI, according to some embodiments of the invention.

In some embodiments, FIGS. 9A-G illustrate sequential GUI displays as a customer selects glasses features, for example, according to one or more feature as illustrated in and/or described regarding the method of FIG. 8.

Figure 9A:
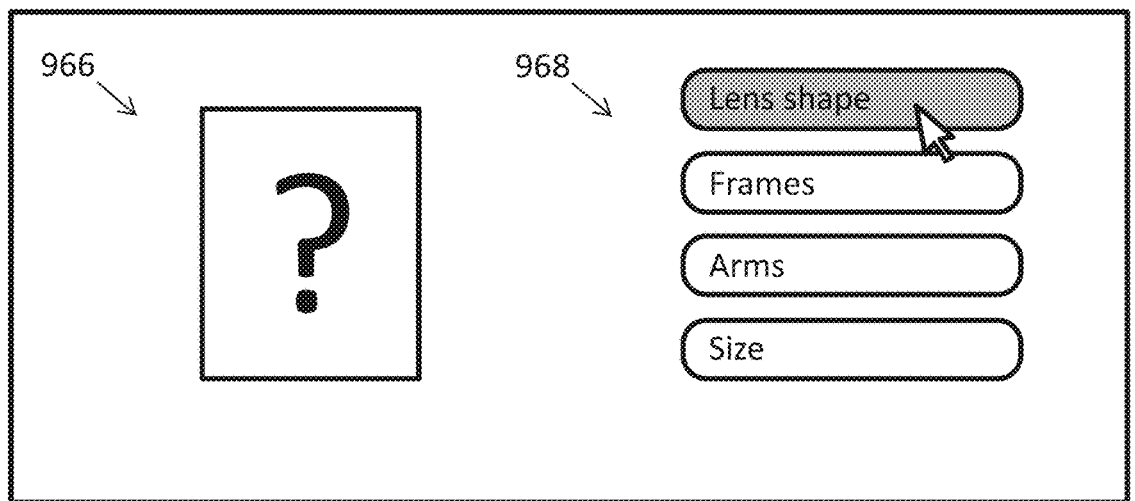

FIG. 9A, in some embodiments, illustrates a view of a glasses feature selection page 964. In some embodiments, page 964 includes a menu region 968 where options are displayed to the user e.g. glasses features options in FIG. 9A. In some embodiments, FIG. 9A illustrates selection of a "lens shape" glasses feature option. In some embodiments, e.g. prior to selection of glasses features, a preview region 966 of page does not show an image of glasses.

Figure 9B:
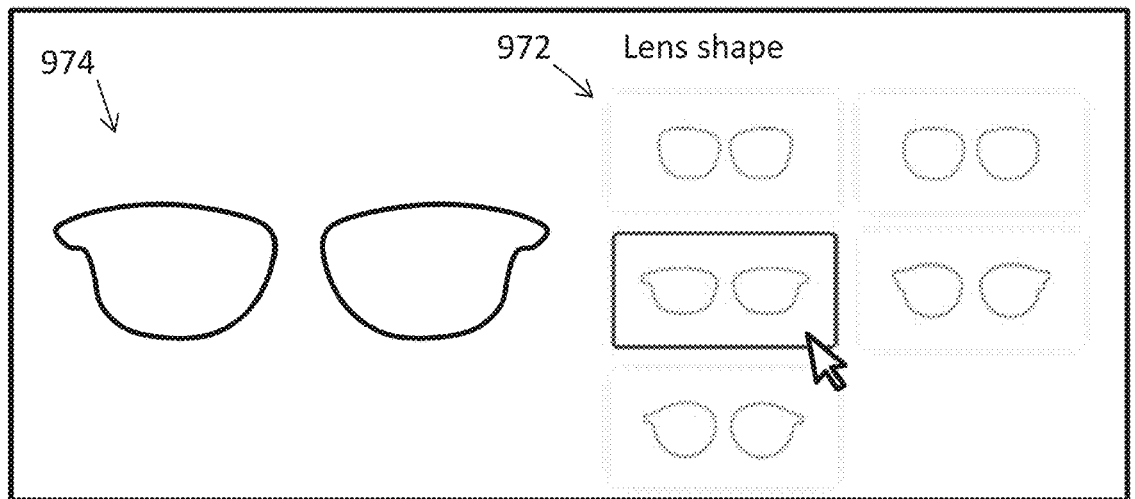

FIG. 9B, in some embodiments, illustrates a glasses feature option selection page 970. In some embodiments, FIG. 9B illustrates an exemplary embodiment of the "lens shape" glasses feature option e.g. as previously selected as illustrated in FIG. 9A. Where, in some embodiments, a menu region 972 of page 970 shows different options for the feature e.g. different lens shapes for the lens shape feature. In some embodiments, options are illustrated by images and/or icons, e.g. as illustrate din FIG. 9B. Alternatively or additionally, text is displayed e.g. a name of the option. In some embodiments, upon selection of an option, glasses with the selected option/s are displayed in a preview region 974 of page 970.

Figure 9C:
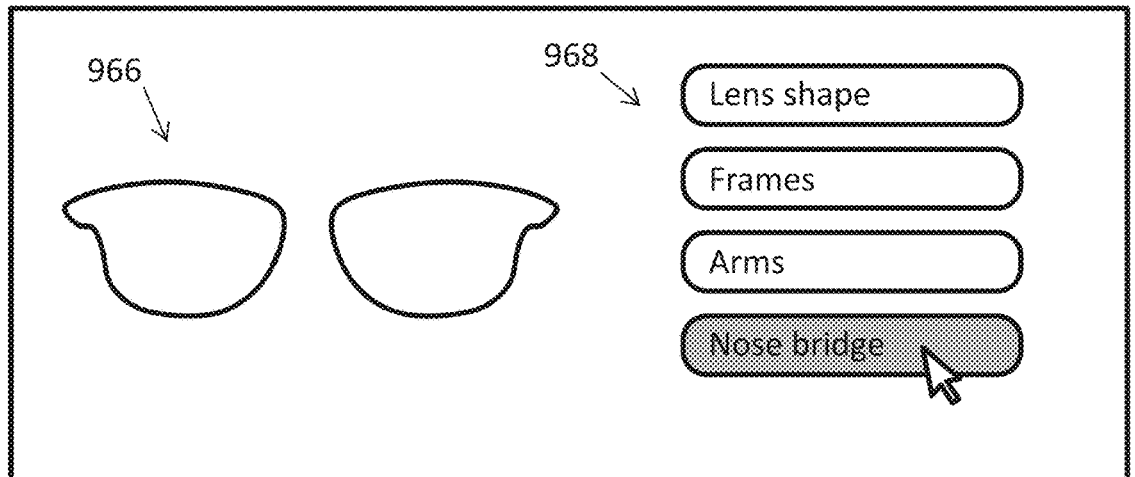

FIG. 9C, in some embodiments, illustrates return to feature selection page 964, where the selected feature is now illustrated in preview region 966. In some embodiments, FIG. 9C illustrates selection of a second feature, a "nose bridge" feature.

Figure 9D:
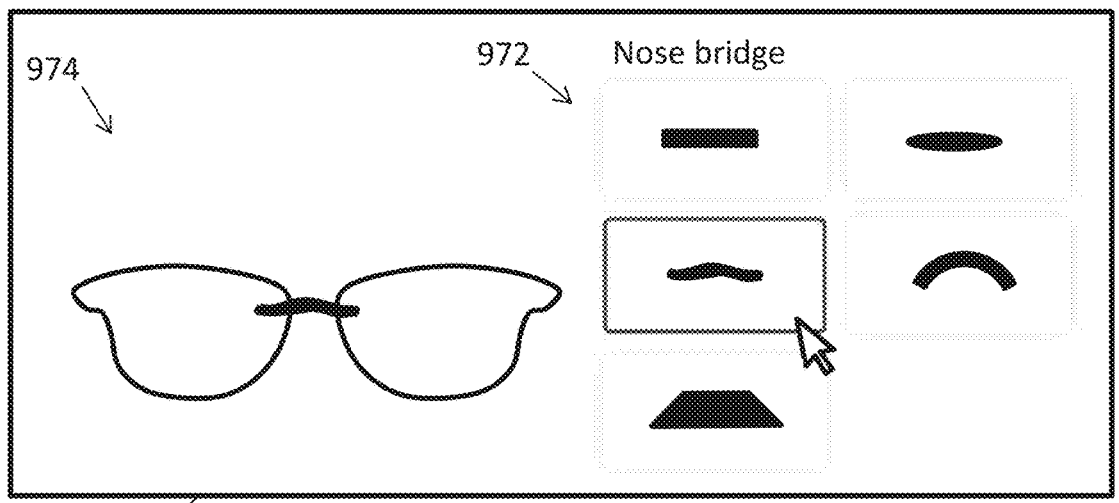

FIG. 9D, in some embodiments, illustrates glasses feature option page 970 displaying "nose bridge" options in menu region 972, and illustrates glasses now having both a selected lens shape and nose bridge in preview zone 974.

Figure 9E:
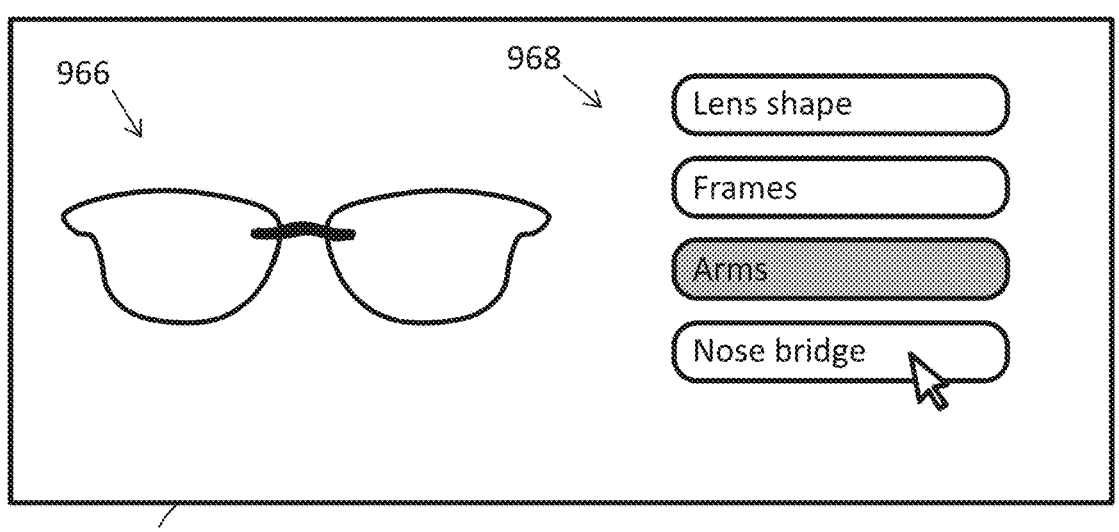

FIG. 9E, in some embodiments, illustrates return to feature selection page 964, where the selected features are now illustrated in preview region 966. FIG. 9E, in some embodiments, illustrates selection of a "arms" glasses feature.

Figure 9F:
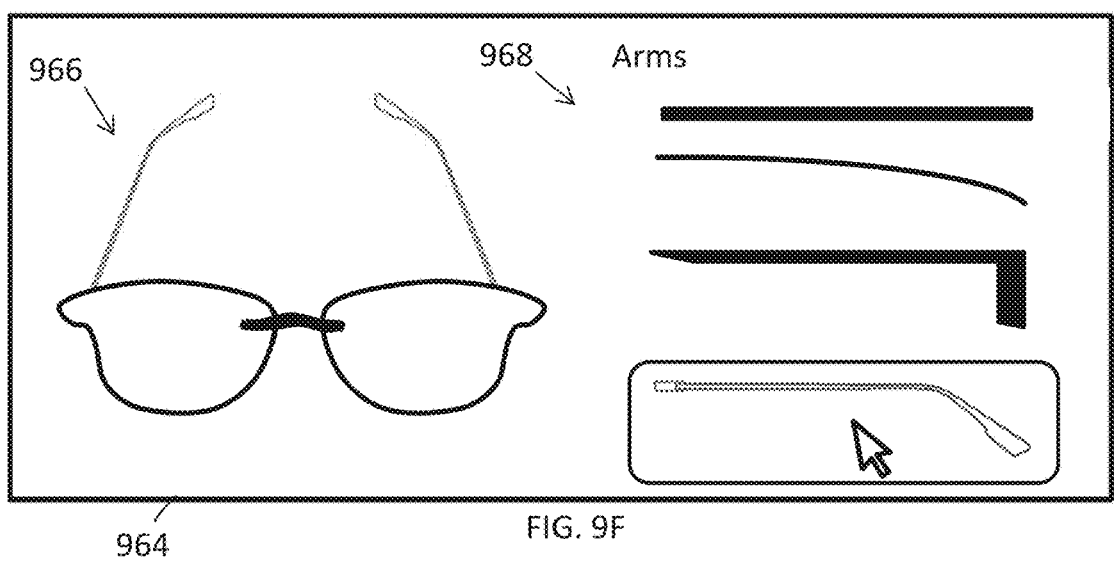

FIG. 9F, in some embodiments, illustrates glasses feature option pay 970 displaying "arms" options in menu region 972, and illustrates glasses now having a selected lens shape, a nose bridge and arms, in preview zone 974.

Figure 9G:
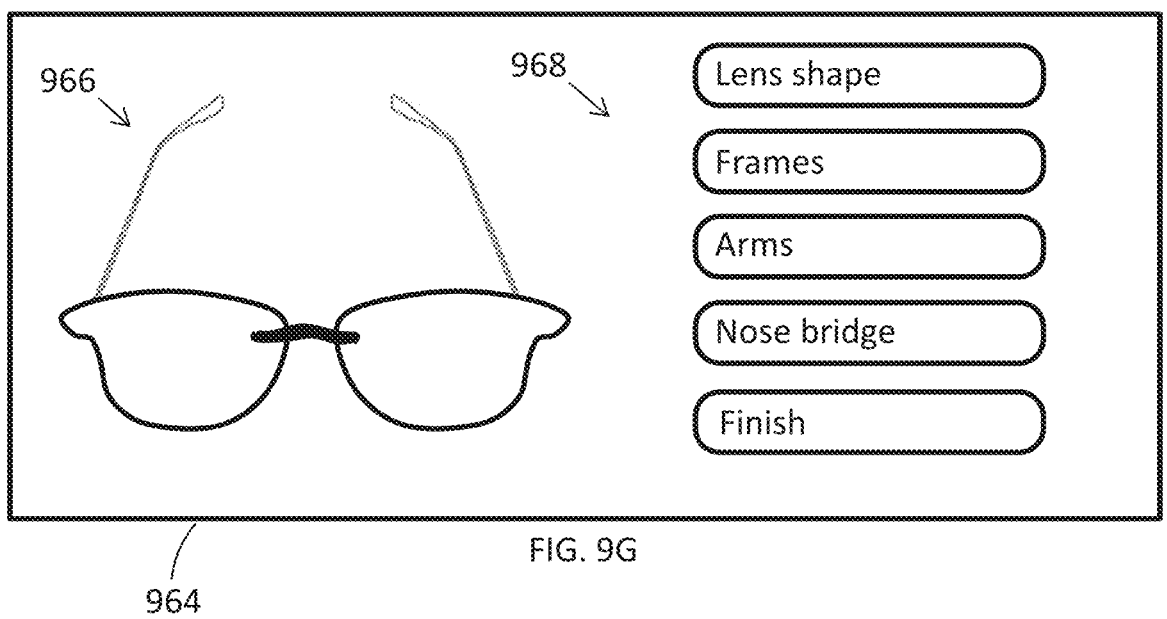

FIG. 9G, in some embodiments, illustrates return to feature selection page 964, where, now that basic options have been selected, allows a user to further change selected options or to proceed to "finish".

FIG. 10 is a method of generating a customer tailored glasses design, according to some embodiments of the invention.

At 1000, in some embodiments, customer data is received. For example, according to one or more feature as described regarding step 200 FIG. 2.

At 1002, in some embodiments, a range of glasses styles are displayed. For example, including one or more feature as illustrated in and/or described regarding FIG. 11. In some embodiments, one or more of the styles presented to the user have been tailored to the user.

At 1004, in some embodiments, a user selects a style e.g. as illustrated by FIG. 11.

At 1006, in some embodiments, an adjustable feature menu is then displayed to the user. For example, including one or more features as described regarding step 806 FIG. 8.

At 1008, in some embodiments, the user then selects a feature, the selecting, for example, including one or more features as described regarding step 808 FIG. 8.

At 1010, in some embodiments, options for the selected feature are displayed to the user, the displaying, for example, including one or more features as described regarding step 806 FIG. 8.

At 1012, in some embodiments, the user selects an option e.g. as illustrated regarding one or more of FIG. 9B, FIG. 9D, and FIG. 9F.

At 1014, optionally, in some embodiments, the product including selected features is displayed, for example, in a preview window. Where, in some embodiments, display is of the style, adjusted based on the user's selections and, optionally, user data e.g. received at step 1000. In some embodiments, product display includes one or more features as described regarding step 810 FIG. 8.

At 1016, in some embodiments, for example, after a user has finished adjusting a style, or the user does not wish to adjust a style, the user enters input to finish adjustment. In some embodiments, a glasses design is then generated, based on the style, user selections and, optionally, in some embodiments, customer data.

FIG. 11 is a simplified schematic of a GUI 1176 of different glasses styles, according to some embodiments of the invention.

In some embodiments, for example, along with a graphic 1178 for the style, user interface page 1176 displays one or more option for adjustment and/or feature of the style is illustrated. For example, one or more of, available colors 1180, style name 1182, and style price information 1184.

In some embodiments, a system employs both feature/s of the method of FIG. 8 and of the method of FIG. 10. For example, in some embodiments, a page (e.g. "home" page) allows a user to select either to build glasses e.g. according to FIG. 8 or to proceed to adjust a style. In some embodiments, a page displays a build glasses option, an adjust, a style option and/or graphical representation of the styles themselves e.g. as illustrated in FIG. 11.

FIG. 12 is a simplified schematic illustrating tailoring of a glasses style 1256 for different customers 1202, 1204, 1206, according to some embodiments of the invention.

FIG. 12 illustrates adjustment of glasses for customers, for example, adjustments as described regarding step/s of FIG. 8 and/or FIG. 10. For example, adjustment of design/s presented to the customer, for example adjustment of a selected design for the customer prior to manufacture (e.g. including scaling).

In some embodiments, size of one or more portion of glasses style 1256 is adjusted based on size of one or more customer facial feature.

For example, in some embodiments, a size e.g. length of a glasses bridge is adjusted based on one or more customer facial feature and/or dimension. For example, based on nose size and/or eye shape and/or eye size and/or pupil distance PD. Where length of a glasses bridge, in some embodiments, is defined by a length of a straight line drawn between connection points of the bridge to the glasses. In some embodiments, apparent glasses bridge length is adjusted based on one or more customer facial feature and/or dimension. Where apparent bridge length is a length of the bridge as visible in the finished glasses (e.g. independent of connection to the bridge to the lenses).

In some embodiments, glasses arm size is scaled, in one or more direction using customer head dimensions, for example, ear size and/or shape and/or position and/or head dimension/s e.g. circumference.

In some embodiments, an arm shape and/or a bridge shape is adjusted based on customer data.

For example, in some embodiments, customer pupil distance (PD) is used to size one or more feature of glasses 1256 e.g. a lens shape e.g. a bridge length and/or apparent length.

In some embodiments, adjustment of sizing of glasses feature/s is performed using a look-up table. Where, for example, customer data is used as input to the table. A potential advantage of a look-up table (e.g. as opposed to a scaling and/or distortion function) is that aesthetics for each glasses configuration in the table, in some embodiments, are checked e.g. by a designer.

In some embodiments, configurations are automatically generated and then checked (and, in some embodiments, adjusted) by a designer.

In some embodiments, glasses shape and/or separation between lenses and/or sizes in one or more direction are determined using customer data. For example, as illustrated in FIG. 12 where lens shape of glasses style 1256 has undergone different sizing in different directions and rotation for customer 1204. In FIG. 12, glasses style 1256 has undergone different scaling in different directions and spacing between the lenses has been scaled, for both customers 1202 and customer 1206.

In an exemplary embodiment, lens shape is based and/or scaled, according to a customer's PD. For example, in some embodiments, a size of a lens is scaled using the customer PD. For example, a circular lens being sized based on the PD.

In some embodiments, when a style is adjusted, a frame pattern is adjusted with the style. For example, in some embodiments, where a frame size is reduced (e.g. for a customer with a small face) in some embodiments, a frame texture and/or pattern scale is reduced e.g. by a same ratio.

FIG. 14 is a simplified schematic of a lens jig 1405, according to some embodiments of the invention.

In some embodiments, jig 1405 includes a base 1460, which in some embodiments, holds rigidly one or more lens holder 1462. For example, a single lens holder. For example, two lens holders. In some embodiments, a jig includes 2-10 holders potentially enabling treatment and/or printing onto a plurality of lenses without needing to reload the jig to the treatment machine and/or printer potentially reducing time of manufacture for multiple pairs of glasses.

In some embodiments, holder 1462 has a mating shape with blocker 1428. For example, where one or more protrusion of blocker 1428 fits into one or more recession in holder 1462 and/or vice versa with recession/s of blocker 1428 and protrusion/s of holder 1462.

In some embodiments, holder 1462 and/or blocker 1428 have asymmetrical shape/s so that lens is positioned in a known orientation on the jig.

In some embodiments, position of holder/s is adjustable e.g. in one or more direction, for example, allowing adjustment for hosting of different sized lenses.

In some embodiments, FIG. 14 illustrates an embodiment, where a single lens 1426 has been attached to a lens holder by a blocker 1428 attached to the lens.

FIG. 15 is a method of glasses manufacture, according to some embodiments of the invention.

At 1500, in some embodiments, a layer for application of frame material to a lens is selected. In some embodiments, the layer has optical power, for example, both the layer itself and a lens (e.g. step 400 FIG. 4) being selected together based on a user prescription.

At 1502, in some embodiments, frame material is applied and/or adhered to one or more surface of the additional layer, for example, to a top surface of the layer and/or to a bottom surface of the layer. Where, in some embodiments, a surface to which the frame material is applied is flat (e.g. deviating from planar as described above).

In some embodiments, application and adhering of frame material to the layer are one step e.g. when application is by printing onto the layer. In some embodiments, application and adhering are different steps where, in some embodiments, material is fixed by an additional step (e.g. heat treatment).

In some embodiments, depositing and/or adhering material to the layer (and/or other portion of the glasses) is by a directable applicator e.g. inkjet head. In some embodiments, alternatively or additionally, to deposition by a directable applicator, deposition is controlled using a mask and/or by applying a material which is a desired size and/or shape (e.g. adhering a transfer).

In an exemplary embodiment, the printing is inkjet printing. Where inkjet printing, in some embodiments, is defined as including propelling ink droplets (e.g. from an ink reservoir) onto a substrate. Where the substrate, in some embodiments, is the layer. In some embodiments, applying (e.g. printing) of the material is according to a glasses design (e.g. as described regarding FIG. 2) and/or frame design data (e.g. as described regarding FIG. 3).

In some embodiments, frame material is applied to portion/s of the layer which have been treated (e.g. treatment as described regarding step 408). In some embodiments, frame material fills depression/s on the layer surface e.g. where the depression/s were formed during treatment.

In some embodiments, sufficient material is applied to have the frame material protrude above a contour of a surface of the layer.

In some embodiments, one or more portion of the frame material is 3D printed e.g. potentially raising frame material above the layer surface and/or forming edges of frames surrounding an edge of the layer.

In some embodiments, treating and printing are used to provide an aesthetic effect. For example, in some embodiments, treatment is used to produce a textured frame material surface. Where, in some embodiments, printing is selectively onto the treated surface. For example, in some embodiments, treatment includes removing different depths of lens material, and printing is into area/s with different depth (e.g. into recession/s).

At 1504, optionally (e.g. alternatively or additionally to treatment of the lens), in some embodiments, the layer is treated. For example, chemically and/or thermally and/or mechanically. In some embodiments, treatment adheres and/or fixes frame material to the layer. In some embodiments, the layer is treated to form a curvature in the layer e.g. configuring it for putting into close contact with a surface of the lens. For example, in some embodiments, a curvature of a side of the layer is increased so that space/s between the layer and the lens when the layer is placed on the lens are reduced.

At 1506, in some embodiments, the layer is put into contact with a surface of the lens. In some embodiments, the frame material which has been applied to the layer contacts the lens surface e.g. the layer being placed on the lens surface "face-down". Alternatively, in some embodiments, an undersurface of the layer (e.g. to which frame material has not been applied and/or is minimally applied) is contacted to the lens surface.

In some embodiments, the layer includes an adhesive layer covering at least a portion of a surface of the layer (e.g. at least 2-50% of the surface). The layer being, in some embodiments, a sticker. Optionally, in some embodiments, the layer and/or frame material on the layer is adhered to the lens surface, for example by applied pressure and/or thermal treatment and/or chemical treatment. In some embodiments, if the frame material is adhered to the lens, the layer is then removed after transfer.

In some embodiments, one or more step of FIG. 16 is part of a method of glasses manufacture as described in one or more steps of FIG. 4. For example, in some embodiments, application of frame material onto the lens e.g. as described in step 410 and/or step 422 of FIG. 4, includes applying, to the lens, the layer and/or frame material on the layer as described in one or more of the steps of FIG. 16.

FIG. 16 is a simplified schematic illustrating manufacture of a pair of glasses, according to some embodiments of the invention.

In some embodiments, a layer 1686 is provided. In some embodiments, layer 1686 is a single component. Alternatively, in some embodiments, layer 1686 includes multiple components.

Optionally, in some embodiments, portion/s of layer/s 1686 are treated e.g. prior to application of frame material.

In some embodiments, frame material is applied to layer 1686, for example, according to one or more feature as described regarding step 1502 FIG. 15. In some embodiments, frame material 1632 is applied by a printer 1606. Where, in some embodiments, printer 1606 includes one or more feature as described regarding printer 106 FIG. 1.

In some embodiments, a lens 1626 is provided. Optionally, in some embodiments, lens 1626 is attached to a blocker 1628 e.g. using a lens orientating device 1602. Where lens orientating device 1602 includes one or more feature of lens orientating device 102 FIG. 1. Where attachment includes one or more feature as described regarding steps 404 and/or 406 FIG. 4.

Optionally, in some embodiments, lens 1626 is coupled to a jig e.g. jig 1405, FIG. 14.

Optionally, in some embodiments, at least a portion of a surface of a side (or both sides) of a lens 1626 is treated. In some embodiment, the side which is to become an anterior surface of the lens (e.g. furthest away from the user's eye surface) when worn as glasses is treated. Alternatively or additionally, in some embodiments, the side which is to become a posterior surface of the lens (e.g. closest to the user's eye surface) when worn as glasses.

In some embodiments, treatment includes removing at least a portion of a coating and/or surface layer on a side of lens 1526. In some embodiments, removal is using a laser removal device. Where the laser removal device, in some embodiments, includes one or more feature of laser removal device 104 FIG. 1. Where the removal includes one or more feature as described regarding step 408 FIG. 4.

Optionally, in some embodiments, after centering of the lens, the blocker is removed.

Optionally, in some embodiments, after application of frame material 1632 to layer/s 1686, the layer/s are treated (e.g. according to one or more feature of step 1504 FIG. 15).

In some embodiments, layer 1686 is placed into contact with lens 1626 where, in some embodiments, layer 1686 and/or frame material 1632 are adhered to lens 1626. In some embodiments, layer 1686 overlaps edges of lens 1686 and/or has a different size and/or shape surface than a lens surface to which it is contacted. In some embodiments, layer 1686 includes one or more marker to assist in correct positioning of layer 1686 on lens 1626. In some embodiments, marker/s are applied to layer 1686 at the same time and/or using the same process as used in application of frame material 1632.

In some embodiments, lens 1626 is cut to shape e.g. by a cutter 1608. In some embodiments, the further process/es are performed on lens 1636 for use of lens 1636 in eyewear (e.g. glasses). For example, including one or more feature described with respect to FIG. 5B.

In some embodiments, cutting of the lens to shape follows application of the layer and/or frame material (and optionally adhering) to the lens. Cutting after application of the frame material potentially eases requirements on positioning of the frame material e.g. where the frame is to extend to an edge of the lens and/or has a specified spatial relationship with the lens. In some embodiments, optical feedback is used by the cutter to position the lens and/or cut along a desired trajectory with respect to the frame material and/or lens.

In some embodiments, lens 1626 is cut to shape prior to application of the layer. Where, optionally, in some embodiments, the layer is of a shape or has been cut to a shape to fit the cut lens. Alternatively or additionally, in some embodiments, the layer is cut to shape after application to the lens.

FIGS. 17A-D illustrate manufacture of a lens with a frame, according to some embodiments of the invention.

FIG. 17A is a simplified schematic cross section of a layer 1786 and frame material 1730, according to some embodiments of the invention.

In some embodiments, layer 1786 is thin and/or flexible. In some embodiments, layer 1786 is easily deformable. In some embodiments, layer 1786 has a surface which is flat e.g. deviating from planar by at most 0.5-4 mm, or by at most 0.5-2 mm, or by at most 1 mm, or lower or higher or intermediate deviations or ranges. In some embodiments, layer 1786 is transparent. In some embodiments, layer 1786 has optical power. In some embodiments different portions of the layer have different thicknesses and/or optical powers.

FIG. 17B is a simplified schematic cross section of a layer 1786 and frame material 1730, according to some embodiments of the invention.

In some embodiments, FIG. 17B illustrates an alternative layer to that illustrated in FIG. 17A. In some embodiments, FIG. 17B illustrates the same layer as FIG. 17A, after treatment (treatment of a layer as described, for example, regarding step 1504, FIG. 15).

FIG. 17C is a simplified schematic cross section of a lens 1726 to which a layer 1786 and frame material 1730 have been applied, according to some embodiments of the invention.

In some embodiments, layer 1786 and frame material 1730 closely follow (e.g. without air pocket/s) a contour of surface 1752. For example, where layer 1786 is sufficiently thin and/or flexible and/or frame material 1730 is sufficiently thin and/or flexible that the contour is followed when layer 1786 and frame material are positioned on surface 1752.

In some embodiments, an air pocket and/or a filler layer of material occupies at least a portion of a space (e.g. filling any space) between layer 1786 and/or frame material 1730 and surface 1752.

In some embodiments, the layer of FIG. 17A or that of FIG. 17B are applied to a lens 1726, where lens 1726 includes one or more feature as described regarding lens 626 FIG. 6A. In some embodiments, lens 1726 includes at least two layers 1748, 1750. In some embodiments, lens 1726 includes a first surface 1752 and a second surface 1758. Where, depending on the customer's prescription, the surfaces 1752, 1758 are posterior or anterior e.g. as described elsewhere in this document. It should be understood that the shapes of lens 1726 illustrated in FIGS. 17C-D are exemplary and other shapes of optical lens are envisioned and encompassed by the invention.

In some embodiments, first layer 1748 and/or second layer 1750 include one or more property as described regarding first layer 648 and/or second layer 650 respectively in FIGS. 6A-G.

FIG. 17D is a simplified schematic cross section of a lens 1726 and frame material 1730, according to some embodiments of the invention.

In some embodiments, e.g. after adhering frame material 1730 to lens 1726, layer 1786 is removed, for example, to provide lens 1726 as illustrated in FIG. 17D.

In FIGS. 17A-D lens 1726 is illustrated as having been cut to shape, and layer 1786 has been illustrated as having a shape matching that of the lens e.g. without extending past edges of the lens. However, for example, as described regarding FIG. 15 and/or FIG. 16, in some embodiments, layer 1786 and/or lens 1726, for one or more of the stages illustrated in FIGS. 17A-D are not yet sized for use in eyewear.

FIGS. 18A-C are simplified schematic cross sections, illustrating manufacture, according to some embodiments of the invention.

FIG. 18A is a simplified schematic cross section of a layer 1886 and frame material 1830, according to some embodiments of the invention.

In some embodiments, layer 1886 includes a body 1890 and adhesive 1888. Layer 1886, for example, being a sticker. Where, in some embodiments, adhesive 1888 is a layer on body 1890 e.g. partially or fully covering a surface of body 1890. In some embodiments, adhesive 1888 is an adhesive layer 1888 e.g. layer 1886 is a sticker.

FIG. 18B is a simplified schematic cross section of a layer 1886 and frame material 1830, according to some embodiments of the invention.

In some embodiments, FIG. 18B illustrates an alternative layer to that illustrated in FIG. 18A. In some embodiments, FIG. 18B illustrates the same layer as FIG. 18A, after treatment (treatment of a layer as described, for example, regarding step 1504, FIG. 15).

FIG. 18C is a simplified schematic cross section of a lens 1826 to which a layer 1886 and frame material 1830 have been applied, according to some embodiments of the invention.

In some embodiments, the layer of FIG. 18A or that of FIG. 18B are applied to a lens 1826, where lens 1826 includes one or more feature as described regarding lens 626 FIG. 6A. In some embodiments, lens 1826 includes at least two layers 1848, 1850. In some embodiments, lens 1826 includes a first surface 1752 and a second surface 1858. Where, depending on the customer's prescription, the surfaces 1852, 1858 are posterior or anterior e.g. as described elsewhere in this document. It should be understood that the shape of lens 1826 illustrated in FIG. 18C is exemplary and other shapes of optical lens are envisioned and encompassed by the invention.

In some embodiments, first layer 1848 and/or second layer 1850 include one or more property as described regarding first layer 648 and/or second layer 650 respectively in FIGS. 6A-G.

In some embodiments, adhesive layer 1888 adheres layer body 1890 and frame material 1830 to lens 1826.

In some embodiments, more than one layer is adhered to the lens e.g. to both surfaces of lens 1758, 1752 FIGS. 17C-D, 1858, 1852, FIG. 18C.

In FIGS. 18A-C lens 1826 is illustrated as having been cut to shape, and layer 1886 has been illustrated as having a shape matching that of the lens e.g. without extending past edges of the lens. However, for example, as described regarding FIG. 15 and/or FIG. 16, in some embodiments, layer 1886 and/or lens 1826, for one or more of the stages illustrated in FIGS. 18A-C are not yet sized for use in eyewear.

General

It is expected that during the life of a patent maturing from this application many relevant glasses manufacture technologies and/or printing technologies will be developed and the scope of the terms "glasses manufacture" is intended to include all such new technologies a priori. As used herein the term "about" refers to ±20%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

As used herein, the term "treating" includes abrogating, substantially inhibiting, slowing or reversing the progression of a condition, substantially ameliorating clinical or aesthetical symptoms of a condition or substantially preventing the appearance of clinical or aesthetical symptoms of a condition.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A pair of glasses comprising:
a first corrective lens;
a second corrective lens, where at least one of said first corrective lens and said second corrective lens has a frame described on a surface of said lens said frame having different optical properties than said surface, said frame extending along at least 10% of an edge circumference of the lens; and a connector connecting said first corrective lens and said second corrective lens, wherein said frame is described by printing directly or indirectly on said lens.

2. The pair of glasses according to claim 1, wherein said frame is adhered to said surface.

3. The pair of glasses according to claim 1, wherein said frame is cut into said surface.

4. The pair of glasses according to claim 1, wherein said frame comprises a different surface coating than said surface.

5. The pair of glasses according to claim 1, wherein said frame has one or more of a different transmittance, a different translucency, a different color, and a different surface texture than said surface.

6. The pair of glasses according to claim 1, wherein a transmittance of said frame is a least 10% less than a transmittance of said lens on which said frame is disposed.

7. The pair of glasses according to claim 1, wherein said frame is opaque.

8. The pair of glasses according to claim 1, wherein said frame is a frame printed directly onto said surface.

9. The pair of glasses according to claim 8, wherein said frame is printed and transferred onto said surface.

10. The pair of glasses according to claim 1, wherein said frame is printed onto a layer which is adhered to the surface.

11. The pair of glasses according to claim 1, wherein material of said frame protrudes above a surface of said lens to which it is adhered by at most 100 μm.

12. The pair of glasses according to claim 1, wherein material of said frame protrudes above a surface of said lens to which it is adhered by at most 50 μm.

13. The pair of glasses according to claim 1, wherein said first lens has said frame adhered to a surface of said first lens and said second lens has said frame adhered to a surface of said second lens.

14. The pair of glasses according to claim 1, comprising a first arm connected to said first corrective lens and a second arm connected to said second corrective lens.

15. The pair of glasses according to claim 1, wherein said frame has a visible pattern of varying color and/or shade.

16. The pair of glasses according to claim 1, wherein said frame does not extend to cover edges of said lens on which it is described.

17. The pair of glasses according to claim 1, manufactured by a method of manufacture comprising:

adhering frame material onto a lens surface of a corrective lens, said frame material extending along at least 10% of an edge circumference of the lens; and attaching said lens to a second lens.

18. The pair of glasses according to claim 17, wherein the method comprises transferring said frame material from a substrate to said lens surface.

19. The pair of glasses according to claim 17, wherein said adhering comprises adhering said substrate to said lens surface.

20. The pair of glasses according to claim 17, wherein said substrate includes an adhesive layer, where adhering said frame material comprises contacting said adhesive layer to said lens surface.

21. The pair of glasses according to claim 17, wherein the method comprises removing a portion of said surface to form at least one recession on said surface.

22. The pair of glasses according to claim 21, wherein said removing is of at least a portion of a lens coating.

23. The pair of glasses according to claim 21, wherein said adhering is to said at least one recession.

24. The pair of glasses according to claim 17, wherein the method comprises surface treating at least a portion of said surface in a manner which improves surface adhesion properties.

25. The pair of glasses according to claim 17, wherein the method comprises cutting said lens to a desired shape after said adherence.

26. The pair of glasses according to claim 1, manufactured by a method of manufacture comprising:

printing frame material onto a lens surface of a corrective lens, said frame material extending along at least 10% of an edge circumference of the lens; and attaching said lens to a second lens.

27. The pair of glasses according to claim 26, wherein said printing comprises inkjet printing.

28. The pair of glasses according to claim 1, wherein the frame provides no mechanical strength to said lens or said glasses.

29. A pair of glasses comprising:

a first corrective lens;

a second corrective lens, where at least one of said first corrective lens and said second corrective lens has a frame described on a surface of said lens said frame having different optical properties than said surface, said frame extending along at least 10% of an edge circumference of the lens; and a connector connecting said first corrective lens and said second corrective lens, wherein said frame does not extend to cover edges of said lens on which it si described.

* * * * *